United States Patent
Nicholson et al.

(10) Patent No.: US 10,705,692 B2
(45) Date of Patent: Jul. 7, 2020

(54) CONTINUOUS AND DYNAMIC SCENE DECOMPOSITION FOR USER INTERFACE

(75) Inventors: Charles Nicholson, San Francisco, CA (US); Gary M. Zalewski, Oakland, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 576 days.

(21) Appl. No.: 12/574,828

(22) Filed: Oct. 7, 2009

(65) Prior Publication Data

US 2010/0295797 A1 Nov. 25, 2010

Related U.S. Application Data

(60) Provisional application No. 61/180,400, filed on May 21, 2009.

(51) Int. Cl.
*G06F 3/048* (2013.01)
*G06F 3/0484* (2013.01)
(Continued)

(52) U.S. Cl.
CPC .......... *G06F 3/04842* (2013.01); *G06F 1/169* (2013.01); *G06F 1/1626* (2013.01);
(Continued)

(58) Field of Classification Search
CPC .... G06F 1/1626; G06F 3/04842; G06F 1/169; G06F 3/03547; G06F 3/04855;
(Continued)

(56) References Cited

U.S. PATENT DOCUMENTS

| 5,119,079 A | 6/1992 | Hube |
| 5,231,698 A | 7/1993 | Forcier |
| (Continued) | | |

FOREIGN PATENT DOCUMENTS

| CN | 1263616 A | 8/2000 |
| EP | 324306 A | 7/1989 |
| (Continued) | | |

OTHER PUBLICATIONS

Notification of Transmittal of the International Search Report and the Written Opinion dated May 13, 2010 for U.S. Patent Application No. (PCT/US10/34649).

(Continued)

*Primary Examiner* — Jeff Piziali
(74) *Attorney, Agent, or Firm* — JDI Patent; Joshua D. Isenberg; Robert Pullman

(57) ABSTRACT

A hand-held electronic device, method of operation and computer readable medium are disclosed. The device may include a case having one or more major surfaces. A visual display and a touch pad are disposed on at least one of the major surfaces. A processor is operably coupled to the visual display and touch screen. Instructions executable by the processor may be configured to: a) present an image on the visual display containing one or more active elements; b) divide the image into one or more regions that fill the display, wherein each region corresponds to a different active element; c) correlating an active element in the image on the visual display to a corresponding active portion of the touch interface; and d) activate one of the one or more active elements in response to a touch to a corresponding one of the active portions of the touch interface.

25 Claims, 13 Drawing Sheets

(51) Int. Cl.
*G06F 1/16* (2006.01)
*G06F 3/0354* (2013.01)
*G06F 3/0485* (2013.01)
*G06F 3/0488* (2013.01)
*G06N 7/00* (2006.01)

(52) U.S. Cl.
CPC .......... *G06F 3/03547* (2013.01); *G06F 3/048* (2013.01); *G06F 3/04855* (2013.01); *G06F 3/04886* (2013.01); *G06N 7/005* (2013.01); *G06F 2200/1637* (2013.01); *G06F 2203/04104* (2013.01); *G06F 2203/04805* (2013.01); *G06F 2203/04806* (2013.01); *G06F 2203/04808* (2013.01)

(58) Field of Classification Search
CPC ................ G06F 3/04886; G06F 3/048; G06F 2200/1637; G06F 2203/04806; G06F 2203/04104; G06F 2203/04805; G06F 2203/04808; G06N 7/005
USPC .......................... 345/173, 156, 179
See application file for complete search history.

(56) References Cited

U.S. PATENT DOCUMENTS

| | | |
|---|---|---|
| 5,342,047 A | 8/1994 | Heidel |
| 5,347,295 A | 9/1994 | Agulnick |
| 5,379,057 A | 1/1995 | Clough |
| 5,526,422 A | 6/1996 | Keen |
| 5,543,588 A * | 8/1996 | Bisset .................. G06F 1/1626 178/18.06 |
| 5,545,588 A | 8/1996 | Yoo |
| 5,555,104 A | 9/1996 | Todaka |
| 5,575,717 A | 11/1996 | Houriet, Jr. |
| 5,612,719 A | 3/1997 | Beernink |
| 5,655,136 A | 8/1997 | Morgan |
| 5,675,362 A | 10/1997 | Clough |
| 5,694,150 A | 12/1997 | Sigona |
| 5,717,939 A | 2/1998 | Bricklin |
| 5,745,116 A | 4/1998 | Pisutha-Arnond |
| 5,818,451 A | 10/1998 | Bertram |
| 5,821,930 A | 10/1998 | Hansen |
| 5,832,113 A | 11/1998 | Sano |
| 5,844,547 A | 12/1998 | Minakuchi |
| 5,889,236 A | 3/1999 | Gillespie |
| 5,910,800 A | 6/1999 | Shields |
| 5,910,802 A | 6/1999 | Shields |
| 5,950,045 A | 9/1999 | Nomura |
| 5,953,011 A | 9/1999 | Matsuoka |
| 5,977,957 A | 11/1999 | Miller |
| 5,996,080 A | 11/1999 | Silva |
| 6,049,329 A | 4/2000 | Zetts |
| 6,073,036 A | 6/2000 | Heikkinen |
| 6,121,960 A | 9/2000 | Carroll et al. |
| 6,130,665 A | 10/2000 | Ericsson |
| 6,154,214 A | 11/2000 | Uyehara |
| 6,157,372 A | 12/2000 | Blackburn |
| 6,211,856 B1 | 4/2001 | Choi et al. |
| 6,271,829 B1 | 8/2001 | Ricotta |
| 6,278,443 B1 | 8/2001 | Amro |
| 6,304,261 B1 | 10/2001 | Shields |
| 6,313,853 B1 | 11/2001 | Lamontagne |
| 6,335,725 B1 | 1/2002 | Rieckenberg |
| 6,335,726 B1 | 1/2002 | Ilan |
| 6,359,572 B1 | 3/2002 | Vale |
| 6,377,228 B1 | 4/2002 | Jenkin et al. |
| 6,411,283 B1 | 6/2002 | Murphy |
| 6,466,203 B2 | 10/2002 | Van Ee |
| 6,501,464 B1 | 12/2002 | Cobbley |
| 6,518,957 B1 | 2/2003 | Lehtinen |
| 6,590,567 B1 | 7/2003 | Nagao |
| 6,590,568 B1 | 7/2003 | Astala |
| 6,597,345 B2 | 7/2003 | Hirshberg |
| 6,608,637 B1 | 8/2003 | Beaton |
| 6,624,832 B1 | 9/2003 | Thomas |
| 6,633,746 B1 | 10/2003 | Walsh |
| 6,639,584 B1 | 10/2003 | Li |
| 6,657,615 B2 | 12/2003 | Harada |
| 6,661,409 B2 | 12/2003 | Demartines |
| 6,677,932 B1 | 1/2004 | Westerman |
| 6,784,873 B1 | 8/2004 | Boesen |
| 6,791,536 B2 | 9/2004 | Keely |
| 6,795,059 B2 | 9/2004 | Endo |
| 6,856,259 B1 | 2/2005 | Sharp |
| 6,882,337 B2 | 4/2005 | Shetter |
| 6,903,722 B2 | 6/2005 | Ohmori |
| 6,926,609 B2 | 8/2005 | Martin |
| 6,934,156 B2 | 8/2005 | Canova |
| 6,956,562 B1 | 10/2005 | O'Hara |
| 6,965,783 B2 | 11/2005 | Pirkola et al. |
| 6,975,306 B2 | 12/2005 | Hinckley |
| 7,000,188 B1 | 2/2006 | Eustace |
| 7,003,308 B1 | 2/2006 | Fuoss |
| 7,016,182 B2 | 3/2006 | Brandenberg et al. |
| 7,030,861 B1 | 4/2006 | Westerman et al. |
| 7,061,474 B2 | 6/2006 | Hinckley |
| 7,084,859 B1 | 8/2006 | Pryor |
| 7,088,345 B2 | 8/2006 | Robinson et al. |
| 7,103,852 B2 | 9/2006 | Kairis, Jr. |
| 7,130,778 B1 | 10/2006 | Connell |
| 7,158,123 B2 | 1/2007 | Myers |
| 7,170,428 B2 | 1/2007 | Himberg et al. |
| 7,224,991 B1 | 5/2007 | Fuoss |
| 7,227,088 B2 | 6/2007 | Luechinger et al. |
| 7,250,939 B2 | 7/2007 | Lira |
| 7,274,353 B2 | 9/2007 | Chiu |
| 7,277,088 B2 | 10/2007 | Robinson et al. |
| 7,292,206 B2 | 11/2007 | Numano |
| 7,292,230 B2 | 11/2007 | Tokkonen |
| 7,319,457 B2 | 1/2008 | Lin |
| 7,339,580 B2 | 3/2008 | Westerman |
| 7,345,675 B1 | 3/2008 | Minakuchi |
| 7,345,679 B2 | 3/2008 | Katayose |
| 7,348,998 B2 | 3/2008 | Belz |
| 7,355,620 B2 | 4/2008 | Ikehata |
| 7,385,592 B2 | 6/2008 | Collins |
| 7,403,192 B2 | 7/2008 | Lai |
| 7,403,378 B2 | 7/2008 | Lo et al. |
| 7,408,538 B2 | 8/2008 | Hinckley |
| 7,443,316 B2 | 10/2008 | Lim |
| 7,446,754 B2 | 11/2008 | Ausbeck, Jr. |
| 7,446,783 B2 | 11/2008 | Grossman |
| 7,450,114 B2 | 11/2008 | Anwar |
| 7,453,443 B2 | 11/2008 | Rytivaara |
| 7,460,893 B2 | 12/2008 | Aarras |
| 7,469,381 B2 | 12/2008 | Ording |
| 7,471,890 B2 | 12/2008 | Lee |
| 7,474,299 B1 | 1/2009 | O'Hara |
| 7,479,948 B2 | 1/2009 | Kim |
| 7,479,949 B2 | 1/2009 | Jobs et al. |
| 7,480,870 B2 | 1/2009 | Anzures |
| 7,489,305 B2 | 2/2009 | Salisbury |
| 7,490,296 B2 | 2/2009 | Feldman et al. |
| 7,499,039 B2 | 3/2009 | Roberts |
| 7,509,588 B2 | 3/2009 | Van Os |
| 7,515,142 B2 | 4/2009 | Park |
| 7,525,537 B2 | 4/2009 | Abdallah |
| 7,530,030 B2 | 5/2009 | Baudisch |
| 7,600,196 B2 | 10/2009 | Oh |
| 7,602,378 B2 | 10/2009 | Kocienda |
| RE40,993 E | 11/2009 | Westerman |
| 7,626,580 B2 | 12/2009 | Keely |
| 7,642,933 B2 | 1/2010 | Patel |
| 7,653,883 B2 | 1/2010 | Hotelling |
| 7,656,316 B2 | 2/2010 | Lazaridis |
| 7,656,393 B2 | 2/2010 | King |
| 7,657,849 B2 | 2/2010 | Chaudhri |
| 7,659,526 B2 | 2/2010 | Zani |
| 7,679,617 B2 | 3/2010 | Kolmykov-Zotov et al. |
| 7,689,932 B2 | 3/2010 | Maktedar |
| 7,705,832 B2 | 4/2010 | Funamoto |
| 7,719,523 B2 | 5/2010 | Hillis |

(56) References Cited

U.S. PATENT DOCUMENTS

| | | | |
|---|---|---|---|
| 7,725,838 B2 | 5/2010 | Williams | |
| 7,730,401 B2 | 6/2010 | Gillespie et al. | |
| 7,760,187 B2 | 7/2010 | Kennedy | |
| 7,761,810 B2 | 7/2010 | Shim et al. | |
| 7,778,988 B2 | 8/2010 | Tateno | |
| 7,782,307 B2 | 8/2010 | Westerman | |
| 7,782,309 B2 | 8/2010 | Janik | |
| 7,786,975 B2 | 8/2010 | Ording | |
| 7,812,826 B2 | 10/2010 | Ording et al. | |
| 7,834,861 B2 | 11/2010 | Lee | |
| 7,844,915 B2 | 11/2010 | Platzer | |
| 7,924,271 B2 | 4/2011 | Christie et al. | |
| 7,941,758 B2 | 5/2011 | Tremblay | |
| 7,958,457 B1 | 6/2011 | Brandenberg et al. | |
| 7,970,438 B2 | 6/2011 | Yoon et al. | |
| 8,035,620 B2 | 10/2011 | Lanfermann | |
| 8,037,421 B2 | 10/2011 | Scott et al. | |
| 8,049,678 B2 | 11/2011 | Lee et al. | |
| 8,059,101 B2 | 11/2011 | Westerman et al. | |
| 8,077,153 B2 | 12/2011 | Benko et al. | |
| 8,130,207 B2 | 3/2012 | Nurmi et al. | |
| 8,201,109 B2 | 6/2012 | van Os et al. | |
| 8,250,001 B2 | 8/2012 | Tirpak et al. | |
| 8,321,809 B2 | 11/2012 | Eom | |
| 8,335,993 B1 | 12/2012 | Tan | |
| 8,352,884 B2 | 1/2013 | Zalewski et al. | |
| 8,375,295 B2 | 2/2013 | Zalewski et al. | |
| 8,434,003 B2 | 4/2013 | Zalewski et al. | |
| 8,558,801 B2 | 10/2013 | Yang et al. | |
| 8,564,544 B2 | 10/2013 | Jobs et al. | |
| 2002/0049510 A1 | 4/2002 | Oda et al. | |
| 2002/0191029 A1* | 12/2002 | Gillespie | G06F 3/0481 715/810 |
| 2003/0189553 A1 | 10/2003 | Goren | |
| 2003/0234768 A1 | 12/2003 | Rekimoto et al. | |
| 2004/0119699 A1 | 6/2004 | Jones et al. | |
| 2004/0178994 A1* | 9/2004 | Kairls, Jr. | G06F 3/0418 345/173 |
| 2004/0205514 A1 | 10/2004 | Sommerer et al. | |
| 2004/0207605 A1 | 10/2004 | MacKey et al. | |
| 2004/0207654 A1* | 10/2004 | Hasuike | G06F 16/9577 345/698 |
| 2004/0212601 A1 | 10/2004 | Cake et al. | |
| 2005/0012723 A1 | 1/2005 | Pallakoff | |
| 2005/0090228 A1 | 4/2005 | Black | |
| 2005/0138575 A1 | 6/2005 | Hashimoto et al. | |
| 2005/0197763 A1 | 9/2005 | Robbins et al. | |
| 2005/0237308 A1 | 10/2005 | Autio et al. | |
| 2005/0237310 A1 | 10/2005 | Fabritius et al. | |
| 2005/0240879 A1 | 10/2005 | Law et al. | |
| 2005/0243068 A1 | 11/2005 | Johnson et al. | |
| 2005/0246459 A1 | 11/2005 | Philipp | |
| 2005/0253816 A1* | 11/2005 | Himberg | G06F 3/016 345/173 |
| 2006/0026535 A1 | 2/2006 | Hotelling et al. | |
| 2006/0041927 A1 | 2/2006 | Stark et al. | |
| 2006/0066588 A1 | 3/2006 | Lyon et al. | |
| 2006/0072028 A1 | 4/2006 | Hong | |
| 2006/0112347 A1 | 5/2006 | Baudisch | |
| 2006/0152499 A1 | 7/2006 | Roberts | |
| 2006/0158459 A1 | 7/2006 | Ferguson et al. | |
| 2006/0192690 A1 | 8/2006 | Philipp | |
| 2007/0252822 A1 | 1/2007 | Kim et al. | |
| 2007/0026371 A1 | 2/2007 | Wood | |
| 2007/0006097 A1 | 4/2007 | Makela | |
| 2007/0120763 A1* | 5/2007 | De Paepe | G06F 3/03547 345/1.3 |
| 2007/0152979 A1 | 5/2007 | Jobs et al. | |
| 2007/0152980 A1 | 7/2007 | Kocienda et al. | |
| 2007/0152984 A1 | 7/2007 | Ording et al. | |
| 2007/0188473 A1 | 8/2007 | Anwar | |
| 2007/0242421 A1 | 10/2007 | Goschin et al. | |
| 2007/0247435 A1 | 10/2007 | Benko et al. | |
| 2007/0250786 A1 | 10/2007 | Jeon et al. | |
| 2007/0273663 A1 | 11/2007 | Park et al. | |
| 2007/0273669 A1 | 11/2007 | Park et al. | |
| 2007/0291338 A1 | 12/2007 | Williams et al. | |
| 2008/0019816 A1 | 1/2008 | Sato | |
| 2008/0036743 A1 | 2/2008 | Westerman et al. | |
| 2008/0070599 A1 | 3/2008 | Apodaca et al. | |
| 2008/0070815 A1 | 3/2008 | Kamada et al. | |
| 2008/0100586 A1 | 5/2008 | Smart | |
| 2008/0134043 A1 | 6/2008 | Georgis et al. | |
| 2008/0135412 A1 | 6/2008 | Cortenraad et al. | |
| 2008/0136786 A1 | 6/2008 | Lanfermann | |
| 2008/0150911 A1 | 6/2008 | Harrison | |
| 2008/0167071 A1* | 7/2008 | Forstall | G06F 9/4451 455/556.2 |
| 2008/0168404 A1 | 7/2008 | Ording | |
| 2008/0177994 A1 | 7/2008 | Mayer | |
| 2008/0183801 A1 | 7/2008 | Marton et al. | |
| 2008/0198160 A1 | 8/2008 | Kolmykov-Zoltov et al. | |
| 2008/0211783 A1 | 9/2008 | Hotelling et al. | |
| 2008/0286822 A1 | 11/2008 | Gallager | |
| 2008/0318635 A1 | 12/2008 | Yoon et al. | |
| 2009/0049395 A1 | 2/2009 | Lee et al. | |
| 2009/0051660 A1 | 2/2009 | Feland et al. | |
| 2009/0058830 A1 | 3/2009 | Herz et al. | |
| 2009/0064047 A1 | 3/2009 | Shim et al. | |
| 2009/0085874 A1 | 4/2009 | Heo et al. | |
| 2009/0143141 A1 | 6/2009 | Wells et al. | |
| 2009/0153588 A1* | 6/2009 | Hasuike | 345/666 |
| 2009/0160785 A1 | 6/2009 | Chen et al. | |
| 2009/0178008 A1 | 7/2009 | Herz et al. | |
| 2009/0197647 A1* | 8/2009 | Shin | 455/566 |
| 2009/0228792 A1* | 9/2009 | van Os | G06F 3/0488 715/702 |
| 2009/0231290 A1 | 9/2009 | Chen | |
| 2009/0237359 A1 | 9/2009 | Kim et al. | |
| 2009/0244092 A1 | 10/2009 | Hotelling | |
| 2009/0254806 A1 | 10/2009 | Bitonti et al. | |
| 2009/0265628 A1* | 10/2009 | Bamford et al. | 715/702 |
| 2009/0278806 A1 | 11/2009 | Duarte et al. | |
| 2009/0315834 A1 | 12/2009 | Nurmi et al. | |
| 2009/0315848 A1 | 12/2009 | Ku et al. | |
| 2010/0020025 A1 | 1/2010 | Lemort et al. | |
| 2010/0020029 A1 | 1/2010 | Park et al. | |
| 2010/0045705 A1 | 2/2010 | Vertegaal et al. | |
| 2010/0048302 A1 | 2/2010 | Lutnick et al. | |
| 2010/0066764 A1 | 3/2010 | Refai | |
| 2010/0083111 A1 | 4/2010 | Reyes | |
| 2010/0098306 A1 | 4/2010 | Madabhushi et al. | |
| 2010/0103117 A1 | 4/2010 | Townsend et al. | |
| 2010/0169819 A1 | 7/2010 | Bestle et al. | |
| 2010/0188353 A1 | 7/2010 | Yoon et al. | |
| 2010/0214218 A1 | 8/2010 | Vaisanen et al. | |
| 2010/0235732 A1* | 9/2010 | Bergman | G06F 3/0488 715/702 |
| 2010/0235787 A1* | 9/2010 | Couse et al. | 715/811 |
| 2010/0241973 A1 | 9/2010 | Whiddett | |
| 2010/0277439 A1* | 11/2010 | Charlier | G06F 1/1616 345/176 |
| 2010/0299595 A1 | 11/2010 | Zalewski et al. | |
| 2011/0093822 A1 | 4/2011 | Sherwani | |
| 2011/0235990 A1 | 9/2011 | Anzures et al. | |
| 2011/0304970 A1 | 12/2011 | Daley, III | |
| 2012/0231852 A1 | 9/2012 | Forstall et al. | |
| 2012/0293440 A1 | 11/2012 | Hotelling et al. | |
| 2013/0154975 A1 | 6/2013 | Han | |

FOREIGN PATENT DOCUMENTS

| | | |
|---|---|---|
| EP | 1939715 A1 | 7/2008 |
| JP | H07281864 A | 10/1995 |
| JP | 08286879 A | 11/1996 |
| JP | 09044330 | 2/1997 |
| JP | H0944330 A | 2/1997 |
| JP | 2000066803 A | 3/2000 |
| JP | 2000081939 A | 3/2000 |
| JP | 2001134382 A | 5/2001 |
| JP | 2001242981 A | 9/2001 |
| JP | 2002077357 A | 3/2002 |

(56) References Cited

FOREIGN PATENT DOCUMENTS

| | | | |
|---|---|---|---|
| JP | 2002259001 A | 9/2002 | |
| JP | 2003296027 A | 10/2003 | |
| JP | 2004234647 A | 8/2004 | |
| JP | 2005234291 A | 9/2005 | |
| JP | 2005530235 A | 10/2005 | |
| JP | 2006067341 A | 3/2006 | |
| JP | 2006318082 A | 11/2006 | |
| JP | 2007082223 A | 3/2007 | |
| JP | 2007141029 A | 6/2007 | |
| JP | 2008065504 A | 3/2008 | |
| JP | 2008123032 A | 5/2008 | |
| JP | 2008146429 A | 6/2008 | |
| JP | 2008204275 A | 9/2008 | |
| JP | 2008217767 A | 9/2008 | |
| JP | 2008541183 A | 11/2008 | |
| JP | 2009042796 A | 2/2009 | |
| JP | 2009087224 A | 4/2009 | |
| WO | 9954807 A | 10/1999 | |
| WO | 0038042 A1 | 6/2000 | |
| WO | 0075766 | 12/2000 | |
| WO | 2006096501 A1 | 9/2006 | |
| WO | 2007089766 A | 8/2007 | |
| WO | 2007082139 A3 | 5/2008 | |
| WO | 2008070815 A1 | 6/2008 | |
| WO | 2009017483 A1 | 2/2009 | |
| WO | 2009031213 A | 3/2009 | |

OTHER PUBLICATIONS

Notification of Transmittal of the International Search Report and the Written Opinion dated May 13, 2010 for U.S. Patent Application No. (PCT/US10/34652).

Notification of Transmittal of the International Search Report and the Written Opinion dated May 13, 2010 for U.S. Patent Application No. (PCT/US10/34653).

Notification of Transmittal of the International Search Report and the Written Opinion dated May 13, 2010 for U.S. Patent Application No. (PCT/US10/34655).

Notification of Transmittal of the International Search Report and the Written Opinion dated May 13, 2010 for U.S. Patent Application No. (PCT/US10/34659).

Notification of Transmittal of the International Search Report and the Written Opinion dated May 13, 2010 for U.S. Patent Application No. (PCT/US10/34657).

"Samsung Dual-touch Patent Application tips Double-Sided Tablet" download Aug. 4, 2010 from http://www.slashgear.com/samsung-dual-touch-patent-application-tips-double-sided-tablets-0396314/.

U.S. Appl. No. 61/180,400, filed May 21, 2009.

U.S. Appl. No. 12/574,838, filed Oct. 7, 2009.

U.S. Appl. No. 12/574,846, filed Oct. 7, 2009.

U.S. Appl. No. 12/574,851, filed Oct. 7, 2009.

U.S. Appl. No. 12/574,857, filed Oct. 7, 2009.

U.S. Appl. No. 12/574,860, filed Oct. 7, 2009.

U.S. Appl. No. 12/574,869, filed Oct. 7, 2009.

U.S. Appl. No. 12/574,887, filed Oct. 7, 2009.

"Fill" Def. 1. Google Dictionary Online, Web (available at https://www.google.com/search?q=fill+definition&ie=utf-8&oe=utf-8&aq=t&rls=org.mozilla:en-US:official&client=firefox-a, last visited Jun. 17, 2013).

"Fill" Def. 1. Oxford Dictionary Online, Oxford University Press 2013, Web (available at http://oxforddictionaries.com/us/definition/american_english/fill?q=fill, last visited Jun. 17, 2013).

"Fill" Def. 2. Collins Dictionary Online, Collins American English Dictionary 2013, (available at http://www.collinsdictionary.com/dictionary/american/fill?showCookiePolicy=true, last visited Jun. 17, 2013.

Final Office Action dated Dec. 13, 2012, for U.S. Appl. No. 12/574,860.

Final Office Action dated Nov. 29, 2012, for U.S. Appl. No. 12/574,857, now U.S. Pat. No. 8,434,003.

Japanese Non-Final Office Action dispatch date Jun. 13, 2013, issued for Japanese Application No. 2012-511896.

Japanese Non-Final Office Action dispatch date Jun. 18, 2013, issued for Japanese Patent Application No. 2012-511895.

Japanese Non-Final Office Action dispatch date Jun. 4, 2013, issued for Japanese Patent application No. 2012-511897.

Microsoft R & D strikes again the LucidTouch, Aug. 24, 2007, 1 page.

Non Final Office Action dated Apr. 8, 2013, for U.S. Appl. No. 12/574,838.

Non Final Office Action dated May 10, 2013, for U.S. Appl. No. 12/574,851.

Non-Final Office Action dated Apr. 10, 2013, for U.S. Appl. No. 12/574,846.

Non-Final Office Action dated May 3, 2012, issued for U.S. Appl. No. 12/574,887.

Non-Final Office Action dated Nov. 28, 2011, issued for U.S. Appl. No. 12/574,887.

Non-Final Office Action dated Jul. 6, 2012, for U.S. Appl. No. 12/574,860.

Non-Final Office Action dated Jun. 21, 2012, for U.S. Appl. No. 12/574,857, now U.S. Pat. No. 8,434,003.

U.S. Appl. No. 13/631,536, filed Sep. 28, 2012.

U.S. Appl. No. 13/631,583, filed Sep. 28, 2012.

Chinese Office Action for CN Application No. 201080022136.2, dated Jul. 23, 2014.

Non-Final Office Action for U.S. Appl. No. 13/361,583, dated Aug. 27, 2014.

Non-Final Office Action for U.S. Appl. No. 13/631,536, dated Jul. 8, 2014.

Chinese Office Action for CN Application No. 201080022116.5, dated Jan. 23, 2014.

Chinese Office Action for CN Application No. 201080022118.4, dated Feb. 8, 2014.

Chinese Office Action for CN Application No. 201080022119.9, dated Nov. 27, 2013.

Chinese Office Action for CN Application No. 201080022136.2, dated Dec. 2, 2013.

Final Office Action for U.S. Appl. No. 12/574,846, dated Mar. 7, 2014.

Grove, Jennifer Van. "50+ iPhone Apps to Enhance Your Photo and Video Experience." Mashable, Dec. 27, 2008. Web. Apr. 8, 2014.

Japanese Office Action for JP Application No. 2012-511896, dated Mar. 11, 2014.

Non-Final Office Action for U.S. Appl. No. 12/574,860, dated Mar. 12, 2014.

Final Office Action for U.S. Appl. No. 12/574,838 dated Sep. 13, 2013.

Final Office Action for U.S. Appl. No. 12/574,851 dated Oct. 11, 2013.

Japanese Office Action for JP Application No. 2012-511895 dated Sep. 17, 2013.

Japanese Office Action for JP Application No. 2012-511899 dated Aug. 6, 2013.

Japanese Office Action for JP Application No. 2012-511900 dated Jul. 23, 2013.

Non-Final Office Action for U.S. Appl. No. 12/574,846 dated Sep. 13, 2013.

Final Office Action for U.S. Appl. No. 12/574,860, dated Oct. 10, 2014.

Notice of Allowance for U.S. Appl. No. 13/631,536, dated Nov. 24, 2014.

Chinese Office Action for CN Application No. 201080022116.5, dated Nov. 17, 2014.

Non-Final Office Action for U.S. Appl. No. 12/574,846, dated Feb. 27, 2015.

Chinese Office Action for CN Application No. 201080022136.2, dated Feb. 9, 2015.

Final Office Action for U.S. Appl. No. 13/631,583, dated Mar. 20, 2015.

Non-Final Office Action for U.S. Appl. No. 12/574,851, dated Apr. 7, 2015.

(56) References Cited

OTHER PUBLICATIONS

Non-Final Office Action for U.S. Appl. No. 13/631,583, dated Jul. 8, 2015.
Final Office Action for U.S. Appl. No. 12/574,846, dated Sep. 25, 2015.
Non-Final Office Action for U.S. Appl. No. 12/574,851, dated Aug. 6, 2015.
Non-Final Office Action for U.S. Appl. No. 12/574,860, dated Aug. 6, 2015.
Final Office Action for U.S. Appl. No. 12/574,851, dated Jan. 14, 2016.
Final Office Action for U.S. Appl. No. 13/631,583, dated Jan. 14, 2016.
Non-Final Office Action for U.S. Appl. No. 12/574,846, dated Mar. 29, 2016.
Notice of Allowance for U.S. Appl. No. 12/574,860, dated Feb. 16, 2016.
Notice of Allowance for U.S. Appl. No. 13/631,583, dated May 26, 2016.
Notice of Allowance for U.S. Appl. No. 12/574,846, dated Aug. 15, 2016.
Chinese Office Action for CN Application No. 20120502424.9, dated Dec. 9, 2016.
Supplementary Partial European Search Report for European Patent Application No. 10778133.8, dated Dec. 16, 2016.
Non-Final Office Action for U.S. Appl. No. 14/671,851, dated Mar. 9, 2017.
Extended European Search Report for European Patent Application No. 10778128.8, dated May 24, 2017.
Chinese Office Action for CN Application No. 201510013415.7, dated Apr. 26, 2017.
European Office Action for EP Application No. 10778131.2, dated Jun. 16, 2017.
European Office Action for EP Application No. 10778132.0, dated Aug. 25, 2017.
European Office Action for EP Application No. 10778128.8, dated Jun. 19, 2017.
Extended European Search Report for EP 10778131.2, dated May 29, 2017.
Extended European Search Report for EP 10778128.8, dated May 30, 2017.
Notice of Allowance dated Aug. 11, 2017 for U.S. Appl. No. 14/671,851.

* cited by examiner

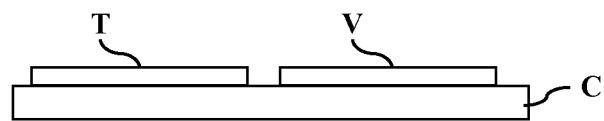
FIG. 1C
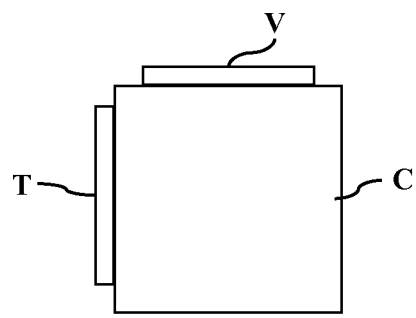
FIG. 1D
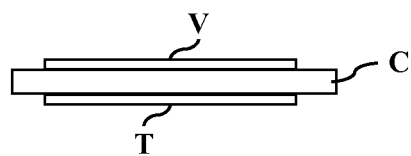
FIG. 1E
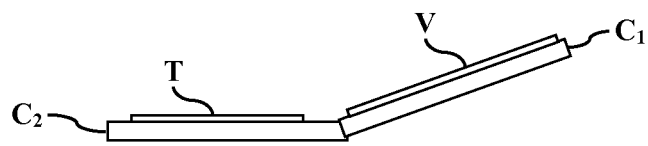
FIG. 1F
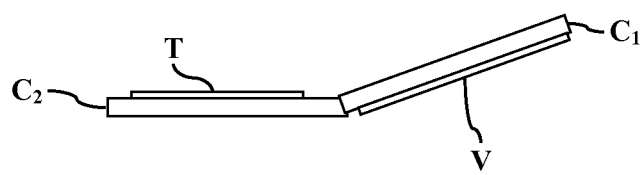
FIG. 1G
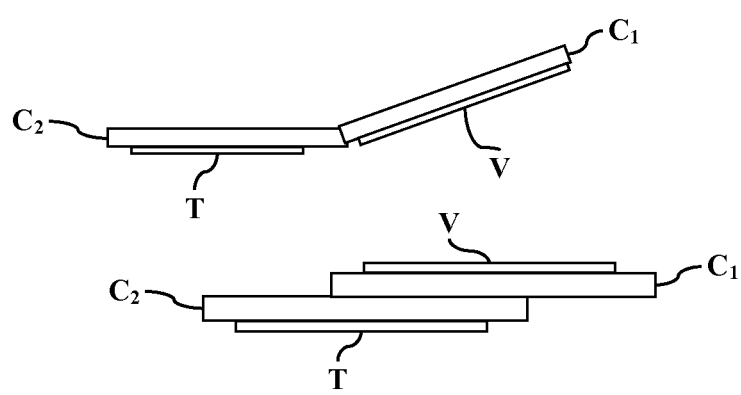
FIG. 1H
FIG. 1I

CONTINUOUS AND DYNAMIC SCENE DECOMPOSITION FOR USER INTERFACE

CLAIM OF PRIORTY BENEFIT

This application claims the priority benefit of U.S. Provisional Patent Application No. 61/180,400, filed May 21, 2009, the entire contents of which are incorporated herein by reference.

CROSS-REFERENCE TO RELATED APPLICATIONS

This application is related to commonly assigned application Ser. No. 12/574,838, to Charles Nicholson and Gary M. Zalewski entitled "HAND-HELD DEVICE WITH ANCILLARY TOUCH ACTIVATED ZOOM" filed the same day as the present application, the entire contents of which are incorporated herein by reference.

This application is related to commonly assigned application Ser. No. 12/574,846, to Charles Nicholson and Gary M. Zalewski entitled "HAND-HELD DEVICE WITH ANCILLARY TOUCH ACTIVATED TRANSFORMATION OF ACTIVE ELEMENT" filed the same day as the present application, the entire contents of which are incorporated herein by reference.

This application is related to commonly assigned application Ser. No. 12/574,851, to Charles Nicholson and Gary M. Zalewski entitled "TOUCH SCREEN DISAMBIGUATION BASED ON PRIOR ANCILLARY TOUCH INPUT" filed the same day as the present application, the entire contents of which are incorporated herein by reference.

This application is related to commonly assigned application Ser. No. 12/574,857, to Charles Nicholson and Gary M. Zalewski entitled "TOUCH CONTROL WITH DYNAMICALLY DETERMINED BUFFER REGION AND ACTIVE PERIMETER" filed the same day as the present application, the entire contents of which are incorporated herein by reference.

This application is related to commonly assigned application Ser. No. 12/574,860, to Charles Nicholson and Gary M. Zalewski entitled "HAND-HELD DEVICE WITH TWO-FINGER TOUCH TRIGGERED SELECTION AND TRANSFORMATION OF ACTIVE ELEMENTS" filed the same day as the present application, the entire contents of which are incorporated herein by reference.

This application is related to commonly assigned application Ser. No. 12/574,869, to Charles Nicholson and Gary M. Zalewski entitled "DYNAMIC RECONFIGURATION OF GUI DISPLAY DECOMPOSITION BASED ON PREDICTIVE MODEL" filed the same day as the present application, the entire contents of which are incorporated herein by reference.

This application is related to commonly assigned application Ser. No. 12/574,887, to Charles Nicholson and Gary M. Zalewski entitled "CUSTOMIZATION OF GUI LAYOUT BASED ON HISTORY OF USE" filed the same day as the present application, the entire contents of which are incorporated herein by reference.

FIELD OF THE INVENTION

Embodiments of the present invention are related to handheld devices and more particularly to hand-held devices that utilize a visual display and touch interface.

BACKGROUND OF THE INVENTION

Handheld consumer electronic devices such as cellular telephones, portable internet devices, portable music players, and hand held gaming devices often include some form of visual display, such as a flat screen video display or a touchscreen display. Touchscreens are displays which also have the ability to detect the location of touches within the display area. This allows the display to be used as an input device, removing the keyboard and/or the mouse as the primary input device for interacting with the display's content. Such displays can be attached to computers or, as terminals, to networks. Touchscreens also have assisted in recent changes in the design of personal digital assistant (PDA), satellite navigation and mobile phone devices, making these devices more usable.

Touchscreens have become commonplace since the invention of the electronic touch interface in 1971 by Dr. Samuel C. Hurst. They have become familiar in retail settings, on point of sale systems, on automatic teller machines (ATMs) and on PDAs where a stylus is sometimes used to manipulate a graphical user interface (GUI) and to enter data. The popularity of smart phones, PDAs, portable game consoles and many types of information appliances is driving the demand for, and the acceptance of, touchscreens.

The visual displays used in hand-held devices are relatively small compared to computer screens or television screens. This often makes it difficult to see information displayed on the screen. Some hand-held devices allow the display to zoom-in on a selected portion of a larger image so that the selected portion may be magnified and viewed in greater detail. To implement such a zoom feature typically requires the hand-held device to implement some way of selecting the portion to be magnified. Prior art solutions include the use of a touchscreen as the visual display and software that allows the user to select the portion of the display to be magnified with his fingers or a stylus. Unfortunately, because the screen is small, the user's fingers often obscure the part that is to be selected making selection difficult.

It is within this context that embodiments of the present invention arise.

BRIEF DESCRIPTION OF THE DRAWINGS

The teachings of the present invention can be readily understood by considering the following detailed description in conjunction with the accompanying drawings, in which:

FIGS. 1C-1I are schematic diagrams of possible handheld devices that may be used in conjunction with embodiments of the present invention.

DESCRIPTION OF THE SPECIFIC EMBODIMENTS

Figure 1A:
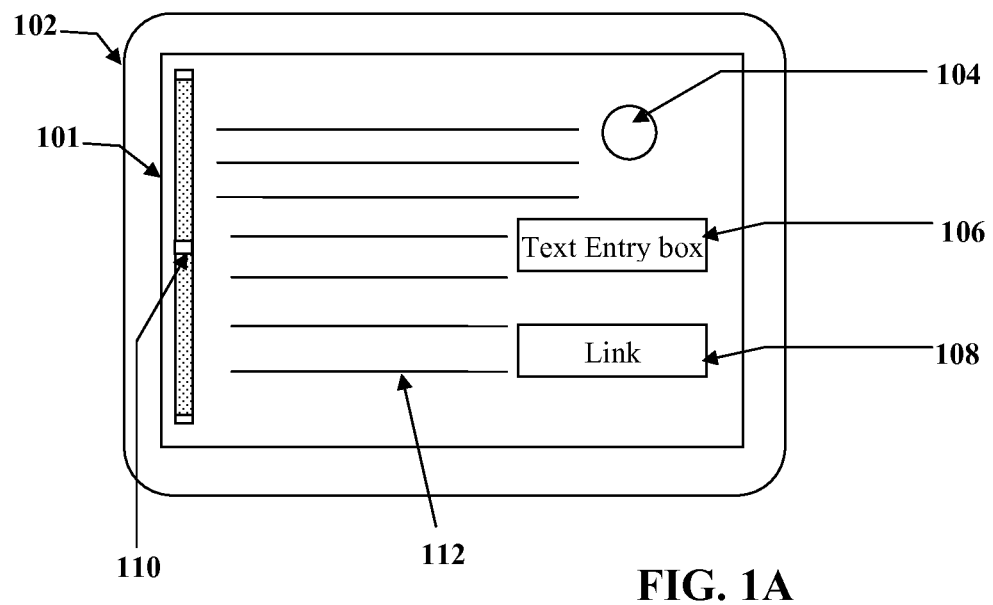
FIG. 1A is a schematic diagram illustrating a portion of content containing active elements on a visual display of a handheld device.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.
Continuous and Dynamic Scene Decomposition for User Interface According to certain embodiments of the present invention, content to be rendered on a hand held device may be decomposed into a number of regions that fill the area of a display screen. Each region may be associated with a different active element of the content that is displayed on the screen. These regions may be mapped to corresponding touch-sensitive regions of a user interface on the device. Each touch-sensitive region corresponds to a different active element. In some embodiments, the user interface may be a touch pad that is separate from the display screen. In other embodiments, the display screen may be a touch screen and the user interface may therefore be part of the display screen. Depending on the type of touch screen, a user may interact with the touch screen with a touch of the user's finger or by touching the screen with a stylus.

By way of example, and not by way of limitation, content, such as a web page, rendered on a hand held device is decomposed into a number of regions. Each region may be associated with a different active element that is displayed. An entire area of a touch pad on the back of the device may be divided into touch sensitive regions. Each touch sensitive region may correspond to a different active element. The displayed web page can be broken into the active regions for the back touch by performing a Voronoi decomposition on the browser-rendered html canvas. A user can then "select" one of the active elements shown on the front screen by touching the corresponding region on the back touch. Since each area on the back touch is much larger than the displayed active element, the active elements are easier to select using the back touch than with the front touch screen.

By way of a more detailed example, content in the form of an html document, such as a web page, may be decomposed into the active regions for the back touch by performing a mathematical decomposition referred to generally as a tessellation on the browser-rendered html canvas. The html canvas determines how the html document is displayed on a screen. The tessellation divides the portion of the document that is to be displayed into a finite number of regions that divide up the area of the screen. Each region corresponds to an active element in the portion of the document that is to be displayed on the screen. According to one embodiment, these regions may be mapped to corresponding touch-sensitive regions of a touch pad. A user can then "select" an active element shown on the front screen by touching the corresponding touch-sensitive region on the touch pad. As a result of the tessellation, each touch-sensitive region may be significantly larger than the corresponding active element displayed on the screen. Consequently, where the screen is a touch screen, the active elements may be easier to select using the touch pad than with the touch screen.

There are a number of different ways in which the tessellation may be performed. In general, it is preferable for the tessellation to divide up the displayed portion of the document into convex regions. By way of example, and not by way of limitation, tessellation of the displayed portion into convex regions may be implemented as a Voronoi decomposition, sometimes also called a Voronoi tessellation, a Voronoi diagram, or a Dirichlet tessellation. The Voronoi decomposition is a kind of decomposition of a metric space determined by distances to a specified discrete set of objects in the space, e.g., by a discrete set of points. In a simplest case, a plane contains a set of points S referred to as Voronoi sites. Each Voronoi site s has a Voronoi cell, also called a Dirichlet cell, V(s) consisting of all points closer to s than to any other site. The segments of the Voronoi diagram (i.e., the edges of the Voronoi cells) are all the points in the plane that are equidistant to two sites. The Voronoi nodes (i.e., the corners of a cell where two edges meet) are the points equidistant to three (or more) sites.

Transformation of active elements may be context sensitive. For example, it may make sense to simply magnify a button to make it easier to use with the touch screen. However, it may be more convenient to transform a scroll bar to a form that is more convenient for a user to manipulate on a touch screen.

As an example, a web page might normally appear on the device's screen as depicted in FIG. 1A. In this example a portion of a web page 101 is displayed on a visual display of a device 102. The web page 101 includes active elements. As used herein, an active element refers to a portion of the displayed web page that a user may interact with through a suitable user interface. Non-limiting examples of active elements include a radio button 104, a text entry box 106, a link 108 (e.g., an html link or web link), and a scroll bar 110. The web page may also include inactive content, such as normal text 112 or images.

Figure 1B:
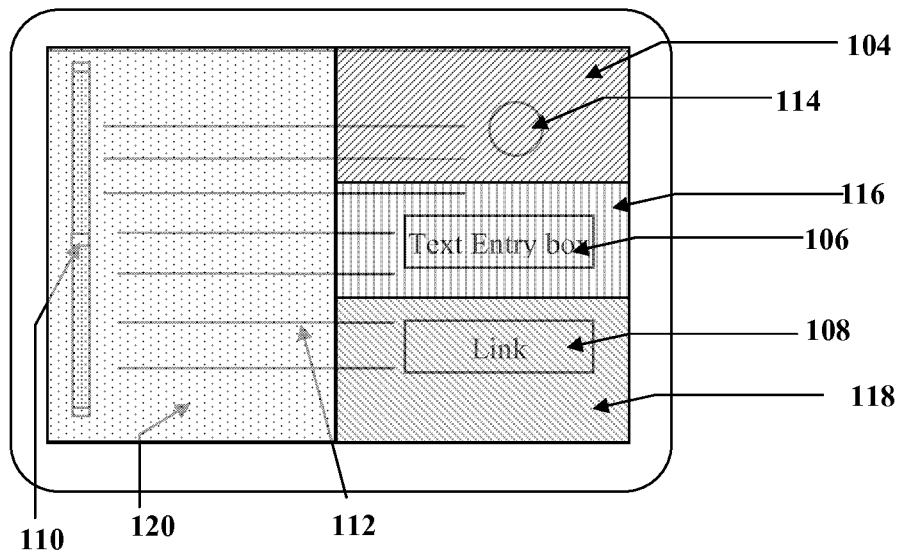
FIG. 1B is a schematic diagram illustrating decomposition of the portion of content displayed on the device in FIG. 1A into sensitive regions corresponding to active elements in accordance with an embodiment of the present invention.

As depicted in FIG. 1B, the area of the displayed web page 101 may be decomposed into a radio button region 114 that corresponds to the radio button 104, a text entry box region 116 corresponding to the text entry box 106, a link region 118 corresponding to the link 108, and a scroll bar region 120 corresponding to the scroll bar 110. It is noted that there is no region corresponding to the text 112 since the text is not an active element in this example. According to some embodiments of the present invention, the radio button region 114, text entry box region 116, and link region 118 may be mapped to corresponding regions on a touch sensitive interface.

In some embodiments, the touch sensitive interface may be a touch screen that is part of the visual display. Alternatively, the touch sensitive interface may be a touch pad that is separate and apart from the visual display. There are a number of possible configurations for the visual display and touch pad. Possible examples of such configurations include one in which a visual display V and a touch pad T are on the same side of a case C, as shown in FIG. 1C, on adjacent sides of the case C, as shown in FIG. 1D, or on opposite sides of the case C as shown in FIG. 1E. Other examples include configurations in which the visual display V and touch pad T are located on separate case portions $C_1$ and $C_2$ respectively. By way of example, and not by way of limitation, the case portions $C_1$, $C_2$ may be connected to each other in a sliding configuration, as shown in FIG. 1F, in a hinged configuration as shown, e.g., in FIG. 1G, FIG. 1H, or FIG. 1I. In FIG. 1F, the visual display V and touch pad T face inward when case portions $C_1$ and $C_2$ are in a closed position. Alternatively, as shown in FIG. 1G, the visual display V may face outward and the touch pad T may face inward (or vice versa) when the case portions $C_1$ and $C_2$ are in a closed position. Furthermore as shown in FIG. 1H, the visual display V and touch pad T face outward when case portions $C_1$ and $C_2$ are in a closed position.

Figure 2A:
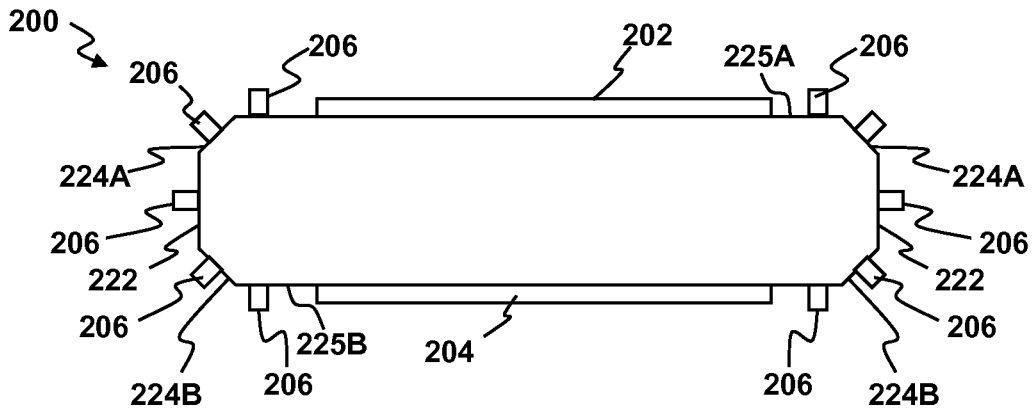
FIG. 2A is a side view diagram of a hand-held device according to an embodiment of the present invention.

According to an embodiment of the invention, a shown in FIG. 2A, a handheld electronic device 200 may include a case 201 with a visual display 202 located on a major surface 225A of the case 201 referred to herein as the front surface. A touch pad 204 may be located on another major surface 225B of the case 201 (referred to herein as the back surface) that is opposite the front surface. The case may be of sufficiently small size that it can be held in a user's hand.

Figure 2B:
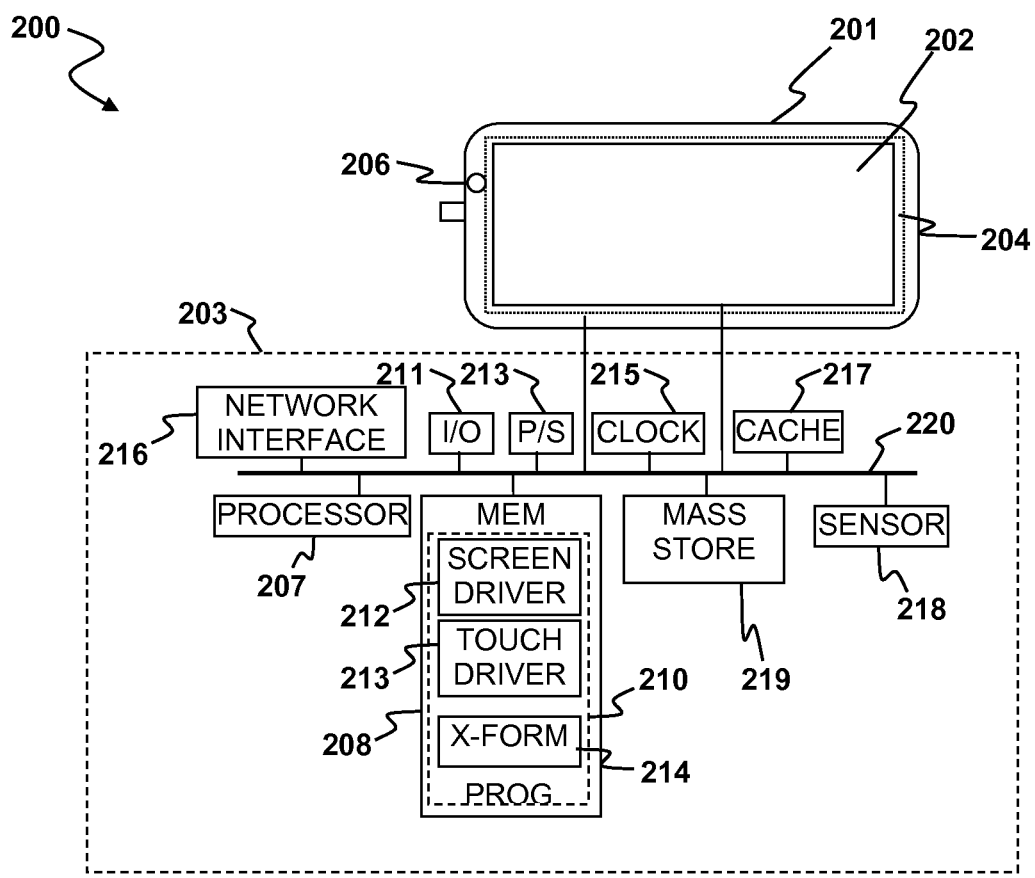
FIG. 2B is a block diagram of a hand-held device according to an embodiment of the present invention.

As seen in FIG. 2B, the device may include a controller 203, the components of which may be located within the case 201. The controller 203 includes a processor 207 operably coupled to the visual display 202 and the touch pad 204. In some embodiments, the device 200 may include multiple processors 207 if parallel processing is to be implemented. The device 200 may be configured for use as a game device, a phone, a portable media player, an email device, web browser device and the like.

The hand-held device 200 may also include well-known support functions, such as input/output (I/O) elements 211, power supplies (P/S) 213, a clock (CLK) 215 and cache 217. The device 200 may optionally include a mass storage device 219 such as a disk drive, CD-ROM drive, flash drive, or the like to store programs and/or data. The touch screen 202, touch pad 204, processor 207, memory 208 and other components of the device 200 may exchange signals (e.g., code instructions and data) with each other via a system bus 220 as shown in FIG. 2B. In some embodiments, the device 200 may include a network interface 216, configured to allow the device to exchange signals with other devices over a network. Furthermore, the hand-held device 200 may include one or more sensors 218. Such sensors may include, e.g., an inertial sensor such as an accelerometer or tilt sensor, an optical sensor, an acoustic sensor such as a microphone or microphone array. The sensors may generate inputs to the program instructions 210 that reflect the environment in which the hand-held device operates.

The visual display 202 may be any suitable form of display capable of presenting visible symbols and/or graphical images. By way of example the visual display 202 may include a flat panel display, such as a liquid crystal display (LCD) or light emitting diode (LED) display. In some embodiments, the visual display 202 on the front surface may also incorporate a touch pad to provide an interface for receiving user commands. In some embodiments the touch pad 204 may optionally include a visual display. The touch pad 204 on the back surface may be based on any suitable touch screen technology, such as resistive, surface-acoustic wave (SAW) capacitive, infrared, strain gauge, optical imaging, dispersive signal technology, acoustic pulse recognition, frustrated total internal reflection or graphics tablet based on magneto-strictive technology that responds to the proximity of a user's fingers. Any of these same technologies may also be incorporated into the visual display 202 on the front surface if desired. In a preferred embodiment, the visual display 202 includes a resistive touch screen coupled to the controller 203 and the touch pad 204 includes a capacitive touch screen.

By way of example a resistive touch screen panel may be composed of several layers including two thin metallic electrically conductive and resistive layers separated by thin space. When some object touches this kind of touch panel, the layers are connected at a certain point. The panel then electrically acts similar to two voltage dividers with connected outputs. This causes a change in the electrical current which is registered as a touch event which may be sent to the processor 207 for processing.

Surface Acoustic Wave technology uses ultrasonic waves that pass over the touch screen panel. When the panel is touched, a portion of the wave is absorbed. This change in the ultrasonic waves registers the position of the touch event and sends this information to the controller for processing.

A capacitive touch screen panel may be coated with a material, e.g., indium tin oxide that conducts a continuous electrical current across the sensor. The sensor therefore exhibits a precisely controlled field of stored electrons in both the horizontal and vertical axes. When the capacitive touch screen's 'normal' capacitance field (its reference state) is altered by an externally applied electric field, e.g., from a user's finger, electronic circuits located at each corner of the panel measure a resultant 'distortion' in the characteristics of the reference field and send the information about the event to the processor 207 for mathematical processing.

An infrared touch screen panel may employ one of two different methodologies. One method uses thermal induced changes of the surface resistance. Another method is an array of vertical and horizontal IR sensors that detected interruption of a modulated light beam near the surface of the screen.

In a strain gauge configuration the screen is spring mounted on the four corners and strain gauges are used to determine deflection when the screen is touched. This technology may also measure movement of the screen 202 along the Z-axis.

In touch screen technology based on optical imaging, two or more image sensors may be placed around the edges (mostly the corners) of the screen. Infrared backlights may be placed in a camera's field of view on the other sides of the screen. A touch shows up as a shadow and each pair of cameras can then be triangulated to locate the touch.

Dispersive signal technology may use sensors to detect mechanical energy in the glass that occurs due to a touch. Complex algorithms then interpret this information and provide the actual location of the touch.

Touch screens based on acoustic pulse recognition may use more than two piezoelectric transducers located at some positions of the screen to turn the mechanical energy of a touch (vibration) into an electronic signal. This signal may then be converted into an audio file, and then compared to preexisting audio profile for every position on the screen.

Touch screens based on frustrated total internal reflection use the principle of total internal reflection to fill a refractive medium with light. When a finger or other soft object is pressed against the surface, the internal reflection light path is interrupted, making the light reflect outside of the medium and thus visible to a camera behind the medium.

In some embodiments, the device 200 may include one or more optional buttons coupled to the controller 203 to provide additional sources of input. There are a number of different possible locations for the optional buttons 206. By way of example, and without loss of generality, one or more optional buttons 206 may be located on the front surface 225A, the back surface 225B, along a side edge 222 of the device 200 or on a beveled edge 224.

The hand-held device 200 may further include a memory 208 (e.g., RAM, DRAM, ROM, and the like). A computer readable medium such as the memory 208 may store program instructions 210 for execution on the processor 207. The program instructions 210 may be configured to respond to inputs from one or more input sources on the device (e.g., the visual display 202, the touch pad 204, or buttons 206) or from remote input sources that are coupled to the device. The program instructions 210 may include display driver instructions 212 configured to generate images displayed on the visual display 202. The program 210 may include touch pad driver instructions 213 that respond to inputs received from the touch pad 204. It is noted that in some embodiments, the functions of the visual display 202 and touch pad 204 may be combined into a single touch screen interface that may serve as both an input and an output device.

Hand-Held Device with Ancillary Touch Activated Transformation of Active Element By way of example, and not by way of limitation, in one version of this embodiment, a hand-held electronic device may have a case with one or more major surfaces. A visual display may be disposed on at least one of the major surfaces. A touch interface may be disposed on at least one of the major surfaces. A processor may be operably coupled to the display and the touch interface. An image containing content may be rendered on the display. The content may be divided into a number of regions. Each region may be associated with a different active element such as a link or check box that is displayed. The entire area of a touch interface may be divided into touch sensitive regions. Each touch sensitive region may correspond to a different active element shown on the display. A user may select an active element by touching the corresponding region on the touch interface. When the active element is selected its appearance and/or operation may be transformed so that the element is easier to manipulate with the touch interface. The transformation may be animated so that the user can easily see which active element is being transformed. After the user interacts with the transformed active element, the element may revert to its original form by a reverse animation.

There are a number of different ways in which the reversion of a transformed element may be triggered. By way of example, and not by way of limitation, if the transformation is triggered by a user's touch on a region of the touch interface 204 corresponding to an active element, the reversion may be triggered by removal of the touch.

Figure 3A:
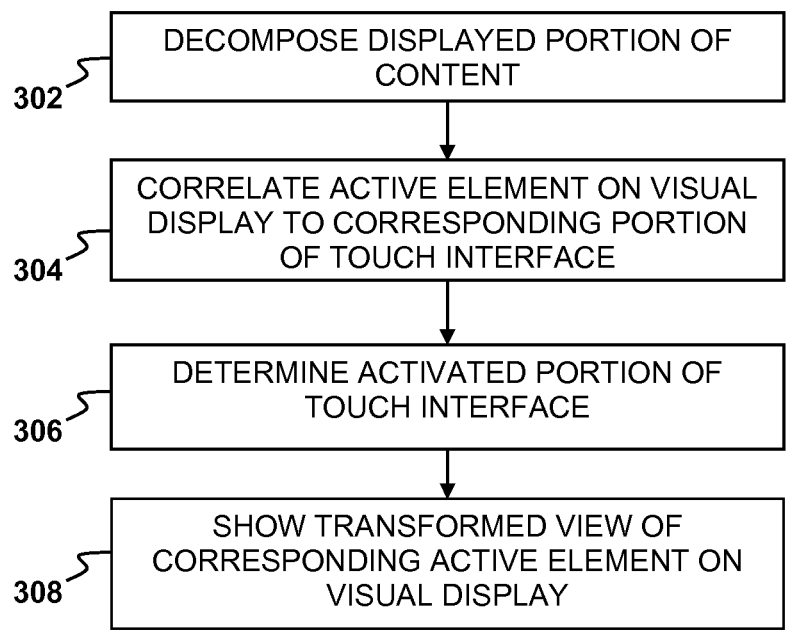
FIG. 3A is a flow diagram of illustrating operation of a hand-held device according to an embodiment of the present invention.

By way of example and not by way of limitation, the program 210 may further include transformation instructions 214, which may be configured, e.g., by appropriate software programming, to operate the device 200 according to a method illustrated generally in FIG. 3A. As indicated at 302 in FIG. 3A, a portion of content to be displayed on the display 202 may be decomposed, e.g., by Voronoi composition, as discussed above. Active elements within the displayed portion may be correlated corresponding portions of a touch interface, as indicated at 304. The touch interface may be the touch pad 204 or the visual display 202, if it includes a touch screen. As a user manipulates the touch interface, the program 210 may determine whether the user has selected any portion of the touch interface that corresponds to an active element, as indicated at 306. If the user selects one of these active portions, a transformed view of the corresponding active element may then be presented on the visual display 202 as indicated at 308.

Figure 3B:
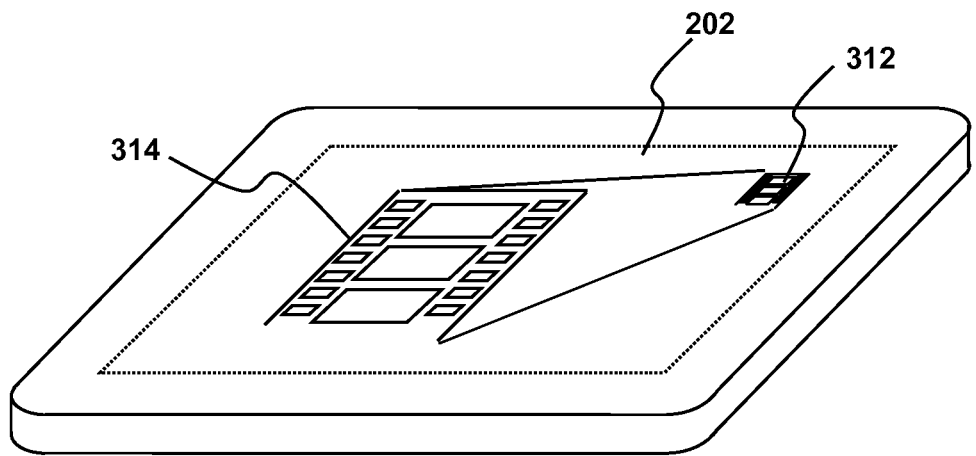
FIG. 3B is a three-dimensional schematic diagram of a hand-held device illustrating magnification of a selected displayed active element according to an embodiment of the present invention.

There are a number of ways in which an active element may be transformed. For example, as illustrated in FIG. 3B, an icon 312 representing an active element may simply be presented in magnified form 314. This allows the magnified form 314 to be more easily manipulated by the user if the visual display 202 is a touch screen. The transformation of the selected active element may be animated so that the user can easily see which active element is being transformed. After the user interacts with the transformed active element, the element may revert to its original form by a reverse animation. The re-transformation may also be animated. There are a number of variations on the transformation of active elements within the scope of embodiments of the present invention. A number of these are discussed below.

Hand-Held Device with Ancillary Touch Activated Zoom

In this embodiment, a hand-held electronic device may have a case with one or more major surfaces. A visual display may be disposed on at least one major surface. A touch pad may be disposed on at least one of the major surfaces. A processor may be operably coupled to the visual display and the touch screen. Instructions executable by the processor may be configured to: a) present an image on the visual display; b) identify an active portion of the touch pad in response to user interaction with the touch pad; c) correlate the active portion of touch pad to a corresponding region of display; and d) present a magnified view of the corresponding region on the visual display. As an example, a user may slide his finger over touch pad on a back side of the device. The location of the user's finger may be mapped to a corresponding region of the display on the front side. A magnified view of this region may be displayed in a window on the display.

Figure 4A:
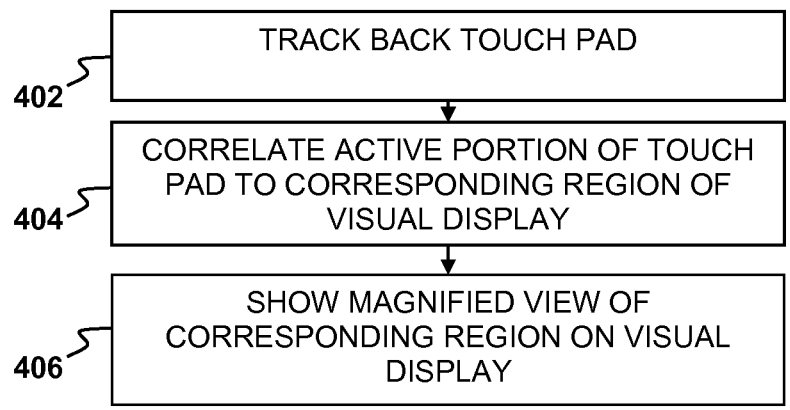
FIG. 4A is a flow diagram of illustrating operation of a hand-held device according to an embodiment of the present invention.
Figure 4B:
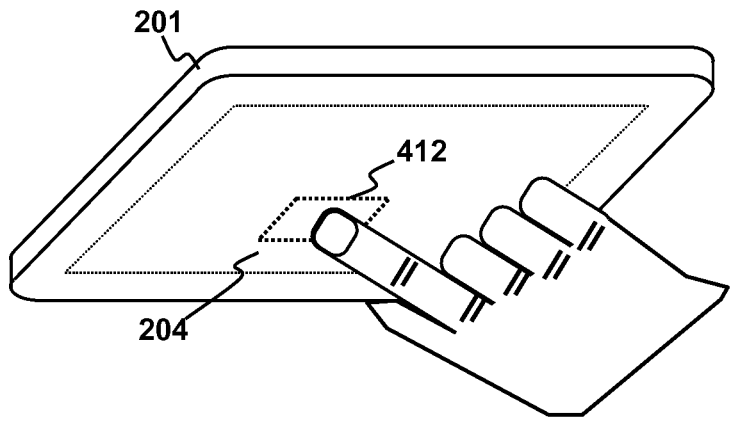
FIG. 4B is a three-dimensional schematic diagram illustrating selection of an active element with a touch pad on a handheld device according to an embodiment of the present invention.

In some versions of this embodiment, the transformation instructions 214 may be configured to track a user's manipulation of the touch pad 204 on the back surface as indicated at 402 in FIG. 4A. A magnified view of a corresponding portion of an image may be presented on the visual display 202. For example, as shown in the flow diagram of FIG. 4A the program 210 may track a user's manipulation of the touch pad 204, as indicated at 402, e.g., using the touch pad driver 213. Specifically, the touch pad driver 213 may determine which portion 412 of the touch pad 204 has been activated by a user's touch, as shown in FIG. 4B. The active portion 412 may be correlated to a corresponding region of the visual display 202, as indicated at 404. A magnified view of the content within the corresponding region 414 may be displayed on the display 202 as indicated at 406.

Figure 4C:
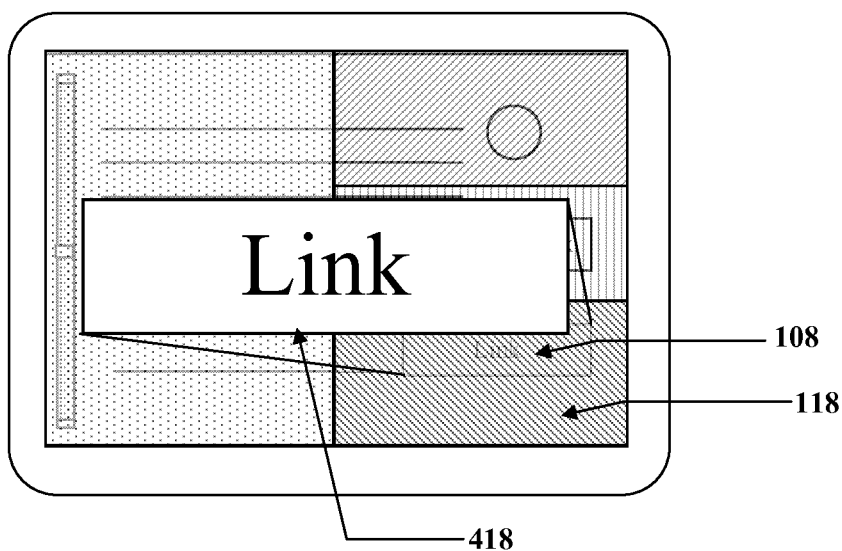
FIG. 4C is a plan view schematic diagram illustrating magnification of an active element in response to activation of a corresponding region of the touch pad.

In some embodiments, the touch pad 204 may be tessellated into regions that correspond to active elements shown on the display 202. When a user activates one of the regions of the touch pad 204 that corresponds to an active element, that active element may be magnified on the touch screen as depicted in FIG. 4B. For instance, referring to the example described above with respect to FIG. 1A-1B, if the user presses the back touch region 118 corresponding to the link 108, a magnified link 418 may be displayed on the touch screen as shown in FIG. 4C.

Figure 4D:
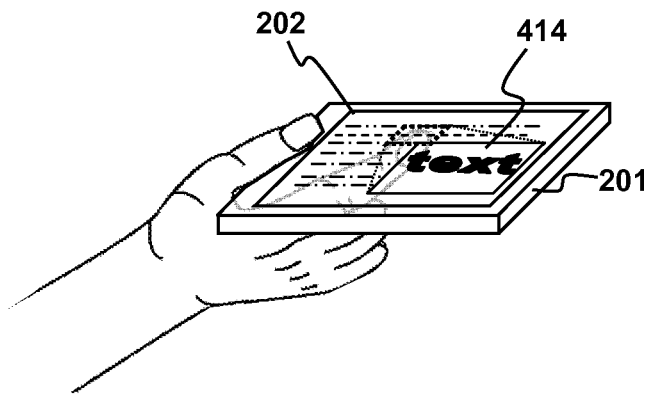
FIG. 4D is a three-dimensional schematic diagram illustrating selective magnification of a portion of content presented on a display of a handheld device using a touch pad according to an embodiment of the present invention.

In alternative versions of embodiment described with respect to FIG. 4A-4B, it is not strictly necessary to perform a tessellation or similar decomposition of displayed portion of content. Instead, the program 210 may simply track the user's activation of a portion of the touch pad 204, correlate the activated portion to a corresponding region of content displayed on the screen and present a magnified view 414 of the content in the corresponding region as shown in FIG. 4D. This makes it much easier to see and user the selected active elements shown on the screen. This also allows for an enhanced usability of the visual display 202 in the case where the visual display is also a touch screen.

It is noted that within the context of embodiments of the present invention there are many alternative ways in which an active element may be transformed once it has been selected through activation of a corresponding region of a touch interface. For example, in addition to, or instead of, altering the displayed size of an active element, the appearance and or nature of operation of an active element may be altered by the transformation.

Figure 5:
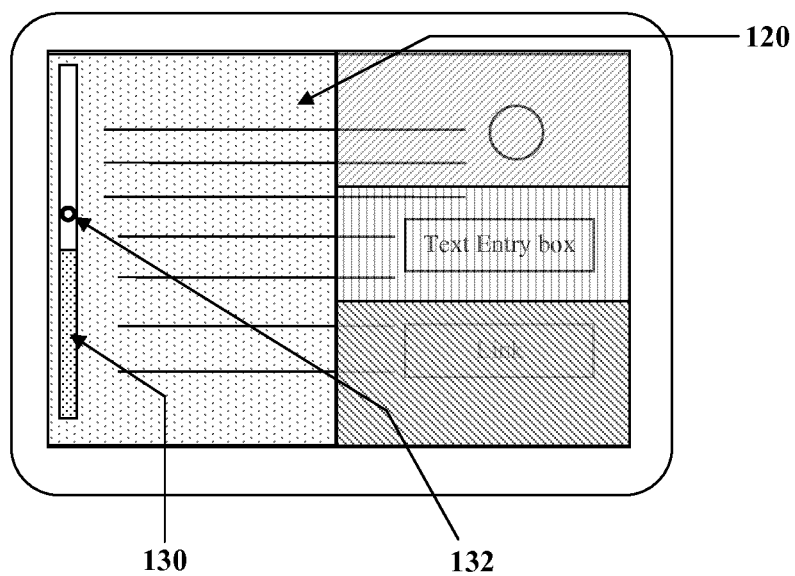
FIG. 5 is a plan view schematic diagram of a handheld device illustrating an example of transformation of an active element presented on a visual display in accordance with an embodiment of the present invention.

By way of example, consider the case shown in FIGS. 1A-1B. It may be impractical to magnify the scroll bar 110. It may also be awkward to manipulate the scroll bar displayed on a small touch screen in a conventional fashion by moving the small box or "clicking" on the up or down arrows at the ends of the scroll bar. Instead of magnifying the scroll bar 110, a transformation may take place as depicted in FIG. 5. In this example, the scroll bar 110 may be transformed into a transformed scroll bar 130 that may operate differently from a conventional scroll bar. For example, the scroll speed and direction of the transformed scroll bar 130 may depend on where the user places a cursor 132 within the scroll bar, e.g., using a stylus. This makes it much easier to use the scroll bar on a touch screen. There are a number of ways in which the appearance and/or nature of operation of an active element may be transformed. For example, a check box may be transformed into a toggle switch, which may be more intuitive to operate on a handheld device.

Touch Screen Disambiguation Based on Prior Ancillary Touch Input

In this embodiment a hand-held electronic device may have a case with first and second major surfaces as discussed above. A touch screen display may be disposed on the first major surface and a touch pad may be disposed on another major surface. An image containing content is rendered on the display. The content can be divided into a number of regions. Each region may be associated with a different active element, e.g., as discussed above. An entire area of a touch pad may be divided into touch sensitive regions. Each touch sensitive region corresponds to a different active element shown on the touch screen. A user may select an active element by touching the corresponding region on the touch pad.

As discussed above, when an active element is selected its appearance and/or operation may be transformed so that the element is easier to manipulate with the touch screen. As noted above, the transformation can be animated so that the user can easily see which active element is being transformed. After the user interacts with the transformed active element, the element may revert to its original form by a reverse animation. For example, when a user selects an active element by pressing the corresponding region on the touch pad, the active element may be magnified on a front display that also acts as a touch screen. After the user has manipulated the transformed active element, the transformed element may revert to its normal appearance. However, the active element that was manipulated may be highlighted on the touch screen so that the user can tell which active element was most recently changed. If the user wants to re-use the highlighted active element, this element can be selected by pressing on the general area of the element on the front touch screen. If the user's finger touches several active elements, this action may be disambiguated as an activation of the highlighted active element.

Figure 6A:
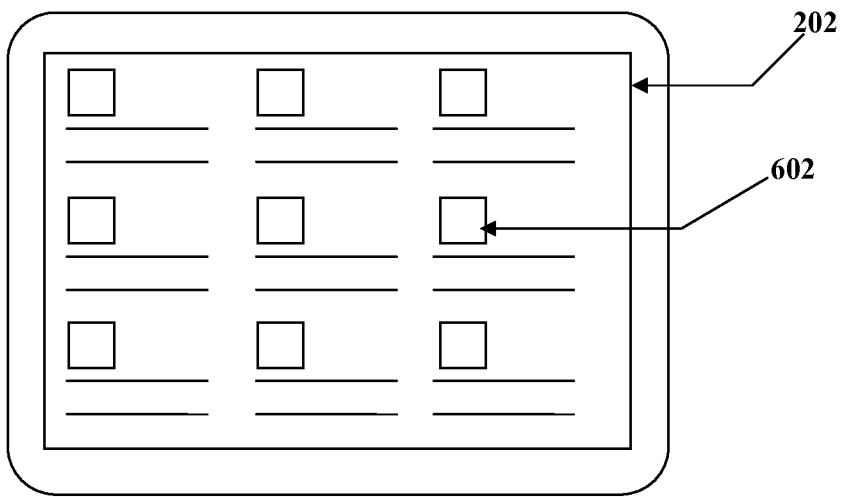
FIGS. 6A-6E are plan view schematic diagrams of a hand-held device at different stages of operation according to an embodiment of the present invention.
Figure 6B:
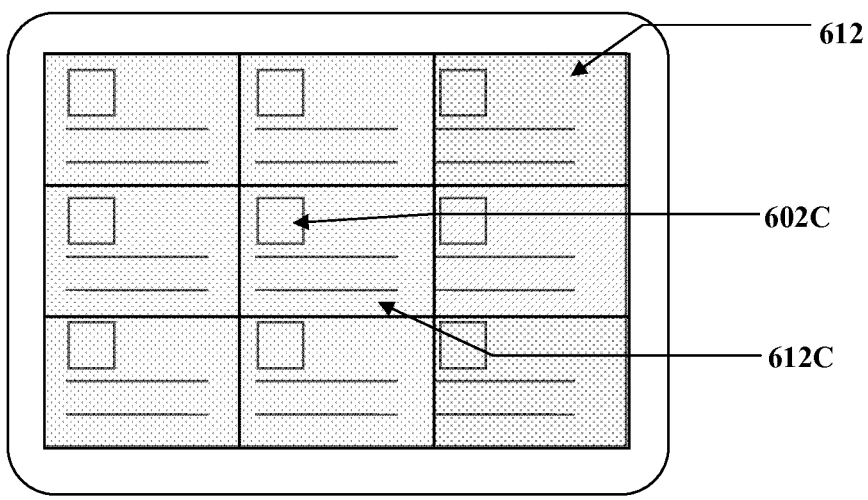

By way of example, and not by way of limitation, as normally displayed, content, such as a web page containing multiple active elements, e.g., check boxes 602 may appear on a touch screen display 202 as shown in FIG. 6A. The area of the displayed page may be broken up into nine different regions 612 as shown in FIG. 6B.

In this example, each check box region 612 is mapped to a different corresponding region of a touch pad (not shown). The touch pad may be located on a different part of the device, e.g., on a back surface of a case 201 or in some other configuration, e.g., as depicted in FIGS. 1C-1I. A user may "select" one of the nine check boxes shown on the touch screen by touching the corresponding region on the touch pad. Since each area on the back touch is much larger than the displayed check boxes, the check boxes are easier for the user to select. When a user selects an active element by pressing the corresponding region on the touch pad, the active element may be magnified or otherwise transformed on the touch screen. The user can then more easily see the active element and/or interact more easily with it using the touch screen 202.

Figure 6C:
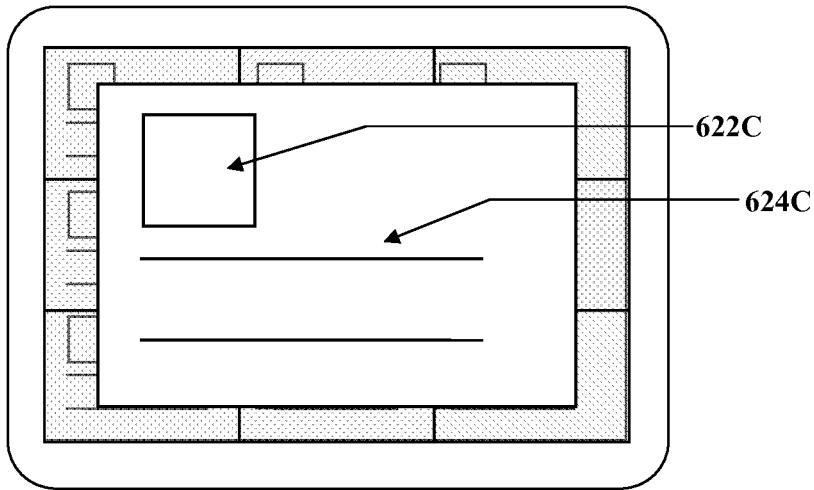

For example, if the user presses a touch pad region 612C corresponding to a center check box 602C, a magnified center check 622C box may be displayed on the touch screen 202 as shown in FIG. 6C. Portions of the displayed content that are associated with the text box, e.g., associated text 624C may also be magnified so that they are easier to read.

Figure 6D:
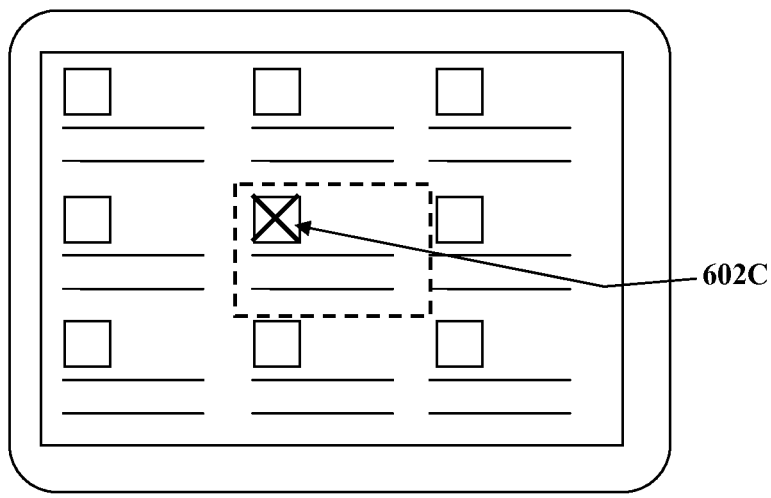

If the user wants to check the center check box 602C, this box can be selected by pressing on the corresponding magnified check box 622C on the touch screen 202, e.g., using a stylus or the user's finger. After the user has selected the magnified center check box 622C, the magnified check box 622C may revert to its normal appearance on within the displayed content. However, the center check box 602 may be highlighted on the display 202 so that the user may easily perceive that the center check box was the one that was most recently changed as shown in FIG. 6D.

Figure 6E:
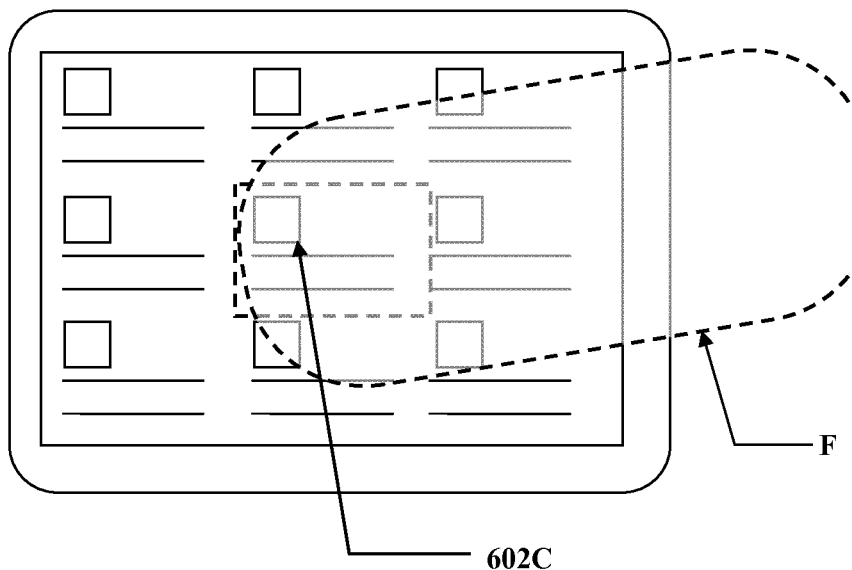

The transform instructions 214 may filter input from the touch screen driver 213 based on the fact that the center check box 602C was the active element that was most recently modified. For example, the tessellated regions corresponding to displayed active elements may be mapped to the touch screen 202 as well as the touch pad 204. The transform instructions 214 may be configured to filter signals corresponding to touch activation of these regions such that a user's touch of any one or more of these regions is interpreted as a touch of the most recently modified active element displayed. This way, an ambiguous input on the touch screen may be disambiguated based on previous user interaction with displayed active elements. Thus, e.g., if the user wants to un-check the center check box 602C, this box can be selected or magnified by pressing on one or more of the check box regions 612 that are mapped to the touch screen 202. Even if the user's finger F touches several check box regions, as depicted in FIG. 6E, the transform instructions 214 may interpret this action as a selection of the center check box 602.

There are a number of possible variations on the embodiment described with respect to FIG. 6A-6E. These variations may address unforeseen problems associated with a hand-held device that uses a touch screen on the front of the device and a touch pad on the back of the device. Many of these problems may arise since the user tends to primarily rely on the front side touch screen since the view of the position of the user's fingers on the backside touch pad is often obscured by the case.

Touch Control with Dynamically Determined Buffer Region and Active Perimeter

This embodiment deals with the problem of how to select multiple active elements on the touch screen of a hand-held device without the user having to hold down a control, e.g., on the backside touchpad, to keep the selected elements magnified or enhanced.

Certain implementations of this embodiment may be based on a modal dialog box format that uses a non-responsive or inactive region that wraps around a perimeter of a state input touch field, and, a dynamically sized accept and cancel region that wraps around the inactive buffer region of the modal dialog box. It is noted that this embodiment may be implemented in a device having a single touch screen. Although two touch interfaces are not necessary, this embodiment may be employed in devices that have two touch interfaces, e.g., a front touch screen and a back touch pad. In one example of this embodiment, select and cancel regions may be dynamically set to a thickness based on the size of a dialog box while preserving buffer region.

According to this embodiment, content rendered on a screen of a hand held device may be divided into a number of regions. Each region is associated with a different active element such as a link or check box that is displayed. The entire area of a touch interface, e.g., a touch screen onto which the content is rendered, or a separate touch pad on the back of the device may be divided into touch sensitive regions. Each touch sensitive region corresponds to a different active element. A user selects an active element by touching the corresponding touch sensitive region. A transformed or magnified active element may be displayed on the screen. The enhanced active element may be manipulated with the touch interface, e.g., a front touch screen or back touch pad. A buffer region surrounds the enhanced active element. Nothing happens if the user touches this area of the touch interface. The remaining region of the touch interface outside the buffer region is repurposed so that touching on this region can either commit to the manipulation of the active element or cancel the manipulation of the active element.

Figure 7A:
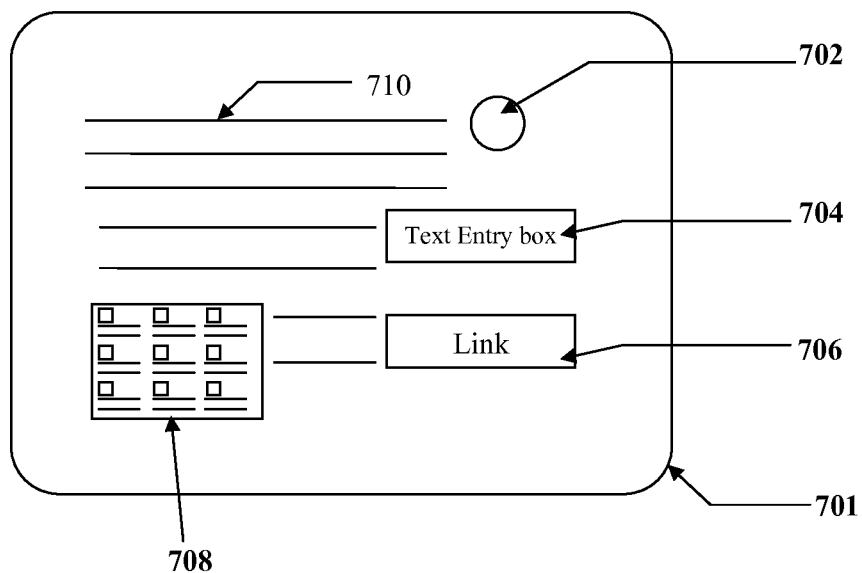
FIGS. 7A-7E are plan view schematic diagrams of a hand-held device at different stages of operation according to an embodiment of the present invention.

By way of example, and not by way of limitation, content 701, such as a web page, might normally be displayed a hand held device's touch screen as shown in FIG. 7A. In this example, the displayed content 701 includes a number of active elements, such as a radio button 702, a text entry box 704, a link 706 and a group of check boxes 708 and inactive elements, such as text 710.

Figure 7B:
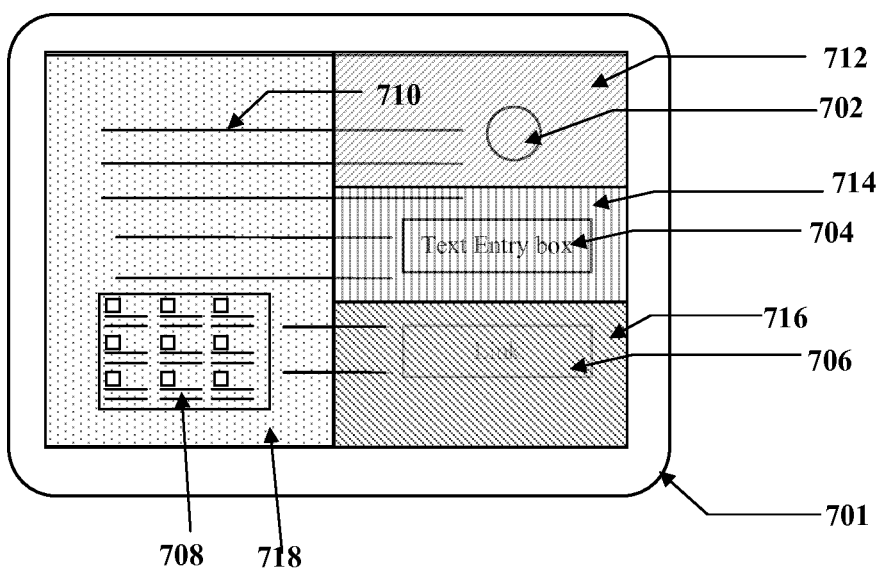

As depicted in FIG. 7B, the active elements may be to corresponding tessellated regions of a touch screen or touch pad, e.g., as described above. Specifically, the displayed content 701 may be decomposed into a radio button region 712 that corresponds to the radio button 702, a text entry box region 714 corresponding to the text entry box 704, a link region 716 corresponding to the link 706, and a text box group region 718 corresponding to the text box group 708. It is noted that there is no region corresponding to the text 710 since the text is not an active element in this example.

Figure 7C:
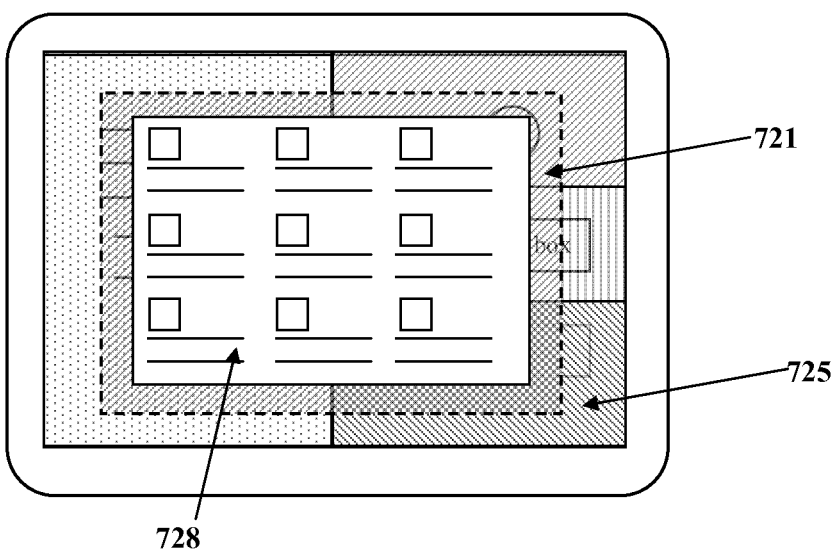

A user may select the check box group, e.g., by touching the corresponding region 718 on device's the touch screen or a separate touch pad. An enhanced (e.g., transformed or magnified) text box group 728 may then be displayed on the touch screen, e.g., as shown in FIG. 7C. Animation may be used to show the transformation or magnification of the text box group so that it will be clear that this is the particular active element that was selected. The transformation or magnification of the text box group 708 allows a user to more easily activate selected check boxes on the touch screen.

Figure 7D:
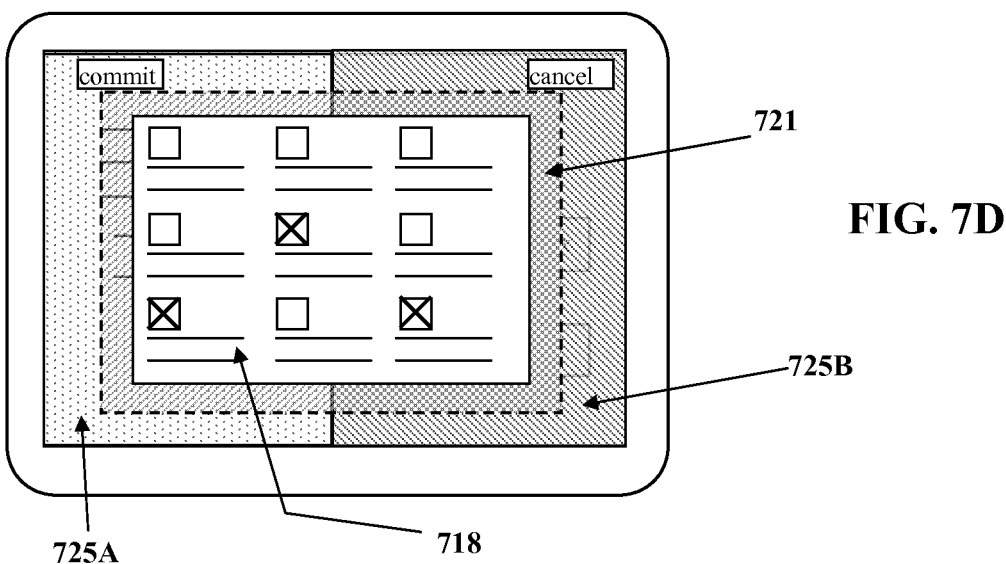

A buffer region 721 of the touch screen surrounds the enhanced check box region 728. The program 210 may be configured such that nothing happens if the user touches the buffer region 721. The remaining region 725 of the touch screen outside the buffer region 721 may be repurposed so that touching on this region can either commit to the selected boxes or cancel the text box selection and make the text boxes go away. For example, as depicted in FIG. 7D, one side of the remaining region 725A of the touch screen may be repurposed as a "commit" button and another side of the remaining region 725B may be repurposed as a "cancel" button. These regions may have different shading and icons may be displayed within each region as a guide to the user. Touching the "commit" region 725A commits the selected check boxes and reverts the enhanced text box region 728 to the original form of the text box group 708. Touching the "cancel" region 725B cancels the selection of the selected check boxes and reverts the enhanced text box region 728 to the original form of the text box group 708.

The thickness of the remaining region 725 may be dynamically determined based on a size of the enhanced check box region 728 in such a way that the buffer region 721 is preserved. By way of example, and not by way of limitation, the buffer region 721 may be preserved it the thickness of the remaining region is adjusted so that the thickness of the buffer region 721 around the enhanced check box region 728 is greater than or equal to some minimum thickness. The minimum thickness may be determined empirically based on some criteria related to ease of use of the device. For example, a minimum thickness of the buffer region may be determined to reduce the likelihood that a user will inadvertently touch the "commit" region 725A or cancel region 725B.

There are a number of possible variations on the embodiment described above with respect to FIGS. 7A-7D. In one variation, the hand held device may include an inertial sensor (e.g., an accelerometer or tilt sensor), which may be used to detect a tilt of the device to toggle between commit and cancel. The user could then touch anywhere in the re-purposed region 725 to activate the commit or cancel. Alternatively, the user may commit or cancel by pressing on a separate touch pad, if the device includes one. A "commit" or "cancel" icon may be displayed on the touch screen depending on which way the device is tilted (as determined by a signal from the inertial sensor). According to another variation on this embodiment, the active element may be a color picker having two modes of operation that may be selected using a re-purposed region 725. For example, the color picker may have a default mode that allows a user to select from among a limited number of colors (e.g., 16 colors). By touching the re-purposed region 725 a user may elect to enter an expanded mode that allows the user to select from a greater number of colors (e.g., 256 colors). The repurposed region 725 may include an icon or other indication to the user that this expanded mode is available.

Another variation addresses the situation where a user has some information copied to a temporary memory location sometimes called a "clipboard". In conventional touch screen interfaces, if the user needs to enter information into the text entry box 704, the device converts part of the touch screen to a virtual keyboard. In conventional hand-held devices, the user must then enter the text with the virtual keyboard. This is often inconvenient, particularly if text can be copied using the device.

Figure 7E:
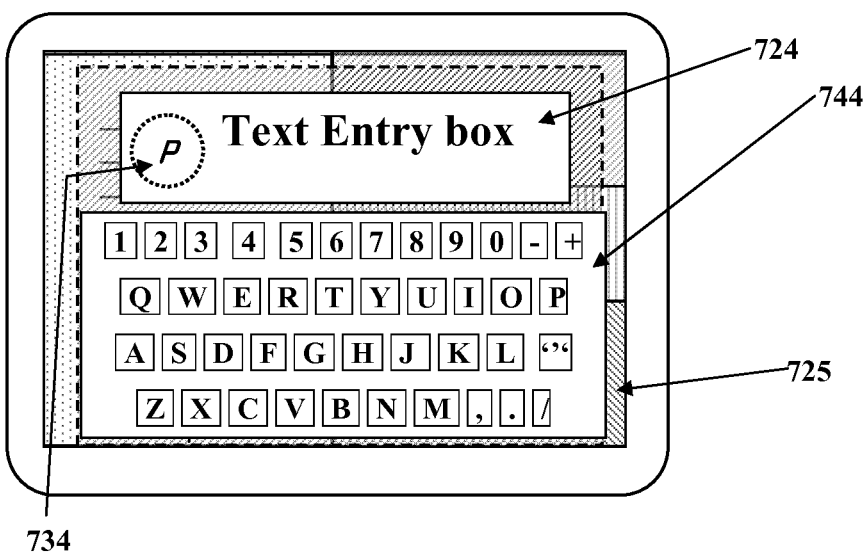

As shown in FIG. 7E, according to an embodiment of the invention, by contrast, a special icon 734 may be shown on the touch screen in conjunction with an enhanced text entry box 724 if the user selects the text entry box region 714 and data has been copied that may be pasted into the text entry box. In some embodiments portions of the touch screen may be repurposed as a virtual keyboard 744, which may be displayed as part of or in conjunction with the enhanced text entry box 724. The user may touch the icon 734 to paste the stored text into the text entry box 704. The user may also enter text via the virtual keyboard. The user may then return the device to normal operation, e.g., through interaction with the touch screen or touch pad. For example, if the text entry box 704 is selected by touching the text entry box region 714 using the touch screen, the user may touch the text entry box region 714 to trigger a return to normal view. Alternatively, if the text entry box 704 is selected by touching and holding the text entry box region 714 on a touch pad on the back of the device, the user may touch the text entry box region 714 to trigger a return to normal view by releasing his touch the touchpad to go back to normal operation. This procedure avoids having to bring up the virtual keyboard for text entry.

Although a number of the embodiments described above relate to a device having a front touch screen and a back touch pad, embodiments of the present invention may be implemented in devices that utilize only a touch screen.

Hand-Held Device with Two-Finger Touch Triggered Selection and Transformation of Active Elements According to this embodiment, content rendered on a display of a hand held device may be divided into a number of regions as discussed above. Each region may be associated with a different active element that is rendered on the display. The entire area of the display is divided into regions that correspond to touch sensitive regions of a touch interface. Each touch sensitive region corresponds to a different active element shown on the display. Touching the touch interface in a first mode (e.g., with a single finger) operates the touch interface normally. Touching one of the touch sensitive regions in another mode of touch (e.g., with two fingers) activates an enhancement (e.g., transformation or magnification) of the active element corresponding to that region. The first and second modes of operation may be defined arbitrarily. However, in a preferred embodiment, a single finger touch operates the touch interface normally and a two-finger touch on a screen region corresponding to an active element initiates the enhancement of that element.

Figure 8A:
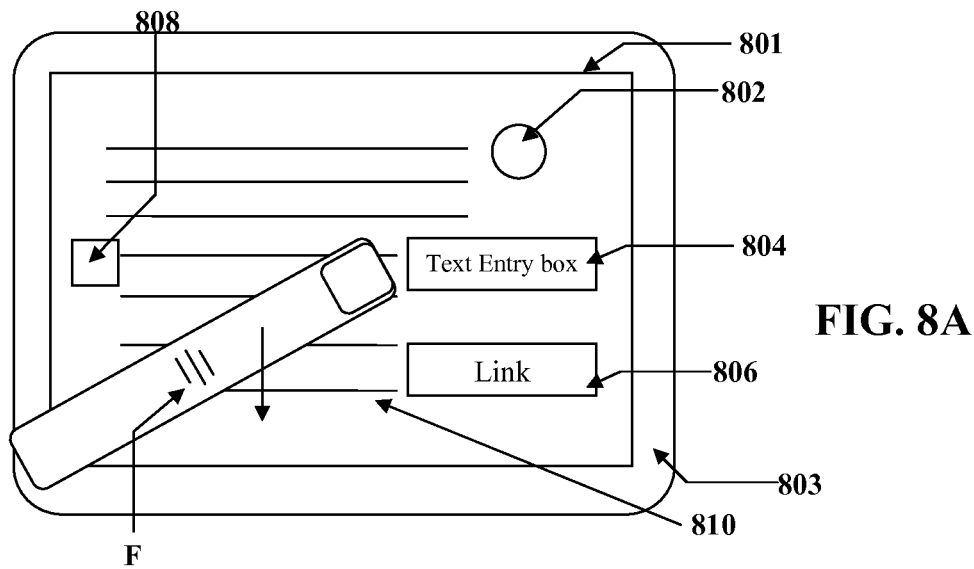
FIGS. 8A-8C are plan view schematic diagrams of a hand-held device having a touch screen at different stages of operation according to an embodiment of the present invention.

By way of example, and not by way of limitation, content 801, such as a web page might normally appear on a touch screen 803 as shown in FIG. 8A. The content 801 may include active elements, such as a radio button 802, a text entry box 804, a link 806 and a check box 808. Inactive normal text 810 or images may also be displayed. In a conventional mode of operation a single finger touch by operates the screen normally. For example, a "swipe" across the surface of the touch screen 803 with a finger F may be interpreted as an instruction to trigger scrolling of the displayed content 801.

Figure 8B:
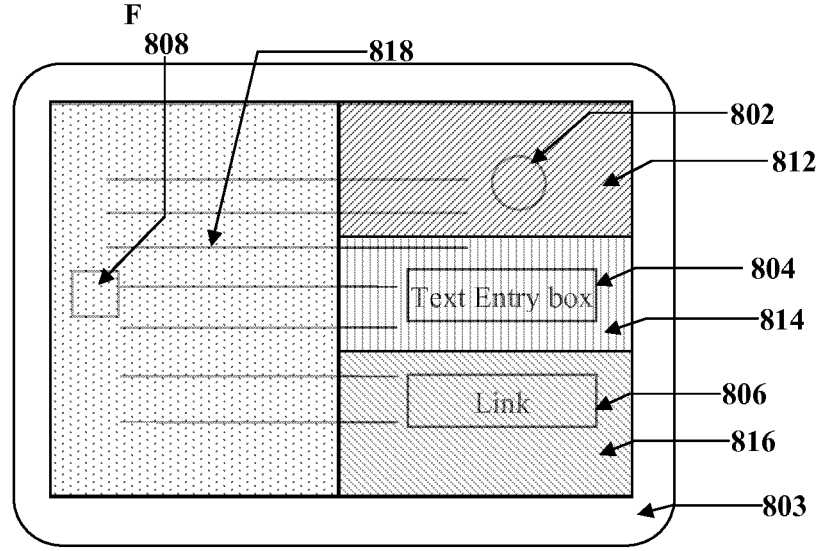

As discussed above, the area of the displayed content 801 may be broken up into four different regions as shown in FIG. 8B. These regions include a radio button region 812 that corresponds to the radio button 802, a text entry box region 814 corresponding to the text entry box 804, a link region 816 corresponding to the link 806, and a check box region 818 corresponding to the check box group 808. It is noted that there is no region corresponding to the text 810 since the text is not an active element in this example.

A user can then "select" one of the four active elements shown on the touch screen 803 by touching the corresponding region on the touch screen with a second touch mode, e.g., a two-fingered touch. Since each sensitive area is much larger than the displayed active element, the active elements are easier to select. When a user selects an active element by pressing the corresponding region on the touch screen with two fingers, the program 210 may interpret this action as an instruction to enhance the corresponding active element, which may then be enhanced, e.g., magnified or transformed, as discussed above. The user can then more easily see the active element and interact more easily with it using the touch screen 803.

Figure 8C:
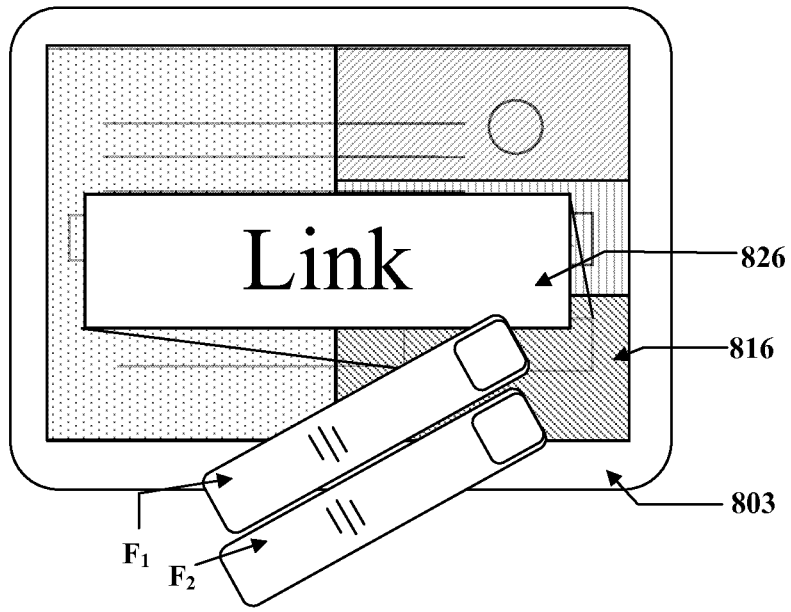

For example, as shown in FIG. 8C, if the user presses the touch screen region 816 for the link with two fingers $F_1$, $F_2$ an enhanced link 826 may be displayed on the touch screen 803. By way of example, the enhanced link 826 may show a pre-rendered image of the web page or other content to which the user may navigate by activating the link.

This embodiment facilitates viewing and using the active elements shown on the screen. This also allows for an enhancement of conventional use of a touch screen. Specifically, a two finger touch on one of the active element regions of the touch screen 803 may be interpreted as equivalent to touch on a corresponding region of a touch pad on a backside of the device. Using two different touch modes, as opposed to two different touch interfaces, may simplify the design of a hand-held device and reduce the devices complexity and cost. Using two different touch modes, may also be advantageous even if the device includes both a touch screen and a separate touch pad. The dual mode touch screen may provide additional flexibility and ease of operation.

In some variations of this embodiment the program 210 may interpret two fingered touch mode actions by tracking the two fingers $F_1$, $F_2$ independently. For example, if the two fingers $F_1$, $F_2$ move in the same direction, the movement may be interpreted as a "swipe" command. If the two fingers $F_1$, $F_2$ move in different directions, this movement may be interpreted as a "pinch" command.

There are other variations on this embodiment. For example, two-fingered touch may be used to trigger element magnification/transformation and single finger touch may be used for scrolling or vice versa. This embodiment may also be combined with other embodiments described above, for example, touching a re-purposed region of the touch screen 803 outside the portion of the screen that displays an enhanced active element may cancel or close the active element. In addition, the concept in this embodiment may be extended to encompass tracking of three or more fingers and associating different modes of operation commands with the number of fingers that are determined to be touching the touch screen and/or touch pad.

The features of this embodiment may be combined the features of other embodiments. For example, use of different touch modes may be control the degree of magnification of an active element or portion of displayed content in the embodiments discussed above with respect to FIGS. 4A-4B. Specifically, the degree of magnification may be correlated to the number of fingers used in the mode of touch.

Dynamic Reconfiguration of GUI Display Decomposition Based on Predictive Model

In this embodiment, content, e.g., a web page rendered on a display, may be decomposed into a number of regions, each of which is associated with a different active element shown on the display. An entire area of a related touch interface may be divided into touch sensitive regions, each of which corresponds to a different active element shown on the display. A user may select one of the active elements by touching the corresponding touch sensitive region. The decomposition may be skewed according to a prediction of which active element is likely to be selected next. The prediction may be determined from a predictive model based on a history of use of the device 200 by the user. The predictive model may be continuously updated as the user uses the device. In some versions of this embodiment, the "skew" of the decomposition may decay over time to a "non-skewed" decomposition that is not based on a prediction. The features of the other embodiments described herein may be combined with the features of this embodiment.

Figure 9A:
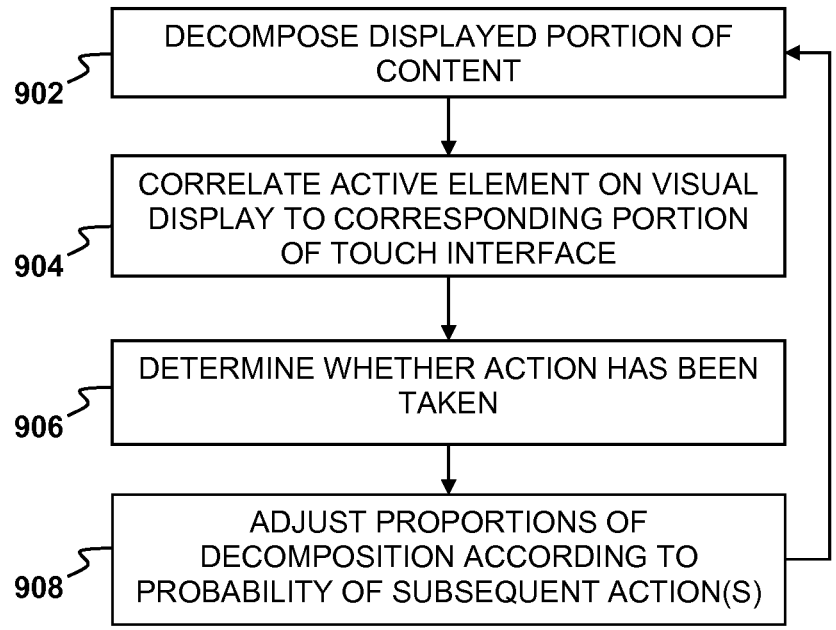
FIG. 9A is a flow diagram of illustrating operation of a hand-held device according to an embodiment of the present invention.

By way of example and not by way of limitation, as noted above, the program 210 may further include a prediction engine 210, which may be configured, e.g., by appropriate software programming, to operate the device 200 according to a method illustrated generally in FIG. 9A. As indicated at 902 in FIG. 9A, a portion of content to be displayed on the display 202 may be decomposed, e.g., by Voronoi composition, as discussed above. Active elements within the displayed portion may be correlated corresponding portions of a touch interface, as indicated at 904. The touch interface may be the touch pad 204 or the visual display 202, if it includes a touch screen. As a user manipulates the touch interface, the program 210 may optionally determine whether the user has taken an action as indicated at 906. By way of example, the program 210 may detect that the user has selected any portion of the touch interface that corresponds to an active element. The program 210 may then adjust proportions of the decomposition of the content shown on the display according to a probability of one or more subsequent actions. The decomposition of the content and correlation of the active regions to corresponding portions of the touch interface may be repeated iteratively over time. By way of example, the prediction engine 221 may compute probabilities for subsequent actions based on past patterns of user behavior following an action of a given type with the device 200. The past behavior may be correlated to a type of content displayed on the display 102. The probabilities may be updated as the user uses the device 200. The screen driver 212 may re-compute the decomposition of the displayed portion of the content according to the probabilities as indicated at 908. The size and/or shape of the resulting active regions of the touch pad 204 may change as a result of the re-computation of the decomposition.

Figure 9B:
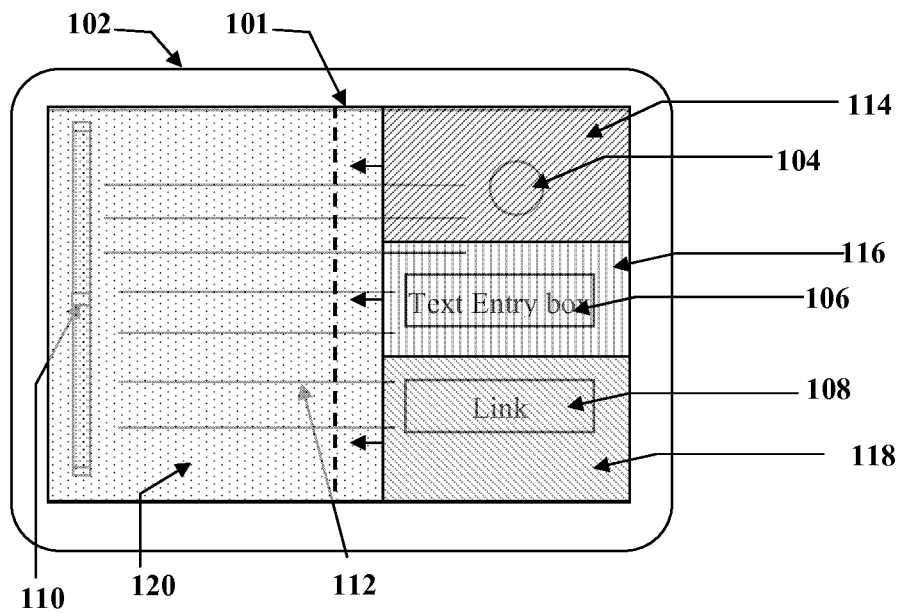
FIG. 9B is a plan view schematic diagram illustrating an example of how decomposition of displayed content may change as probability of subsequent actions change.

FIG. 9B illustrates an example of how the decomposition of the display may change as probability of subsequent actions change. By way of example, as depicted in FIG. 9B, the device may display content such as a web page in response to an initial user action. In this example, the displayed content, e.g., a web page 101 displayed on a visual display of device 102 may include active elements, such as a radio button 104, a text entry box 106, a link 108 (e.g., an html link or web link), and a scroll bar 110. The content may also include inactive content, such as normal text 112 or images. As described above, the area of the displayed content page 101 may be decomposed into a radio button region 114 corresponding to the radio button 104, a text entry box region 116 corresponding to the text entry box 106, a link region 118 corresponding to the link 108, and a scroll bar region 120 corresponding to the scroll bar 110. No region corresponds to the text 112 since, in this example, the text is not an active element. The radio button region 114, text entry box region 116, link region 118, and scroll bar region 120 may be mapped to corresponding regions on a touch sensitive interface.

The prediction engine 221 may determine that, based on passed user behavior, the user is more likely than not to next use the scroll bar 110 than the radio button 104 once the content 101 is displayed. Consequently, the display driver 212 may compute a decomposition of the content 101 in which scroll bar region 120 is initially made larger and the radio button region 114, text entry box region 116 and link region 118 may be made smaller than would otherwise be the case if these regions were determined from a simple unbiased decomposition of content 101, e.g. by tessellation of an html canvas. The display driver 212 may compute the relative areas of the radio button region 114, text entry box region 116, link region 118, and scroll bar region 120 in accordance with the relative probabilities that the user is likely to use these regions within a given time frame.

The likelihood that the user will next use the scroll bar 110 may change over time. Thus, e.g., as a result of iteration of the decomposition and correlation processes, the boundary between the scroll bar region 120 and the other three regions may move over time making the scroll bar region smaller and the other three regions larger until the boundary is located where it would be if determined from a simple unbiased decomposition of the content 101. Other variations are possible based on the amount of information available to the prediction engine about past user behavior. For example, as time passes it may become more likely that the user will use the text box 106. If so, the text box region 116 may grow relative to the other three regions. It is noted that the corresponding probabilities for each active region may decay over time to an unbiased probability. Consequently, the tessellation of the image may decay over time to an unbiased tessellation in such a case.

The features of this embodiment may be mixed with the features of other embodiments described herein. By way of further non-limiting example, the features of this embodiment may be mixed with the features described above with respect to FIGS. 6A-6E. Specifically, the decay of the skew in the decomposition of the displayed content may be applied where an ambiguous input on the touch interface is to be disambiguated based on previous user interaction with displayed active elements as described e.g., with respect to FIG. 6E. In general, the tessellation of the displayed content may decay from a biased tessellation in which a touch anywhere on the touch interface is interpreted as an activation of a most recently transformed active element to an unbiased tesselation. Specifically, the decomposition may decay over time from one in which the center check box 602C, may be selected or magnified by pressing on one or more of the check box regions 612 that are mapped to the touch screen 202 to one in which the center check box can only be selected or magnified by pressing on the portion of the touch interface that corresponds to the center check box.

Customization of GUI Layout Based on History of Use

In a variation on the embodiments described above, the layout of content on a display of a graphical user interface (GUI) may be arranged in a predictive fashion based on a history of use of the GUI. The "layout" may include which items are displayed, where they are displayed, in what order they appear, how they appear, and how they work. The layout may decay to a non-predictive layout over time. The features of the other embodiments described herein may be combined with the features of this embodiment.

If the GUI includes a touch interface, the entire area of a touch interface may be divided into touch sensitive regions, each of which corresponds to a different active element. A user can select one of the active elements by touching the corresponding touch sensitive region. The decomposition may be skewed according to a prediction of which active element is likely to be selected next. The prediction may be determined from a predictive model based on user behavior.

Figure 10A:
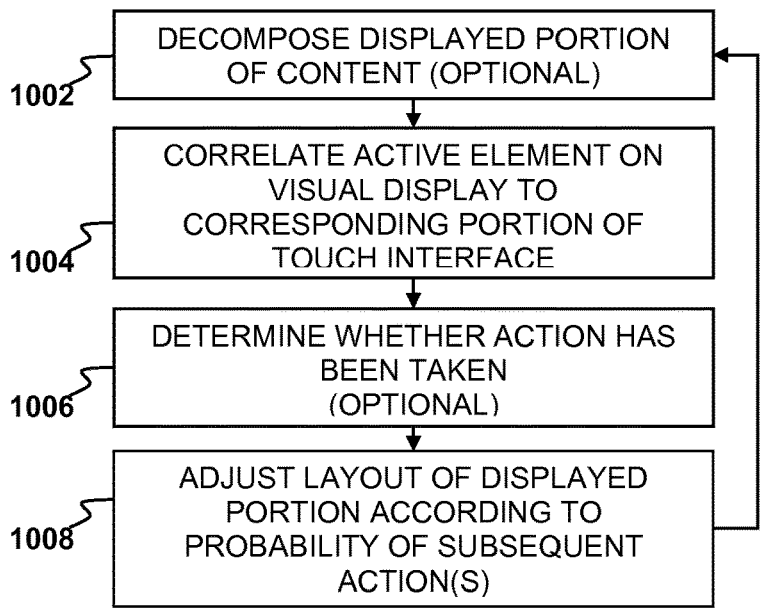
FIG. 10A is a flow diagram of illustrating operation of a hand-held device according to an embodiment of the present invention.

By way of example and not by way of limitation, as noted above, the program 210 may further include a prediction engine 210, which may be configured, e.g., by appropriate software programming, to operate the device 200 according to a method illustrated generally in FIG. 10A. As indicated at 1002 in FIG. 10A, a portion of content to be displayed on the display 202 may optionally be decomposed, e.g., by Voronoi composition, as discussed above. Active elements within the displayed portion may be correlated corresponding portions of a touch interface, as indicated at 1004. The touch interface may be the touch pad 204 or the visual display 202, if it includes a touch screen. As a user manipulates the touch interface, the program 210 may optionally determine whether the user has taken an action as indicated at 1006. By way of example, the program 210 may detect that the user has selected any portion of the touch interface that corresponds to an active element. The program 210 may then adjust the layout of the content shown on the display according to a probability of one or more subsequent actions as indicated at 1008. The adjustment of the content layout and subsequent decomposition of the content and correlation of the active regions to corresponding portions of the touch interface may be repeated iteratively over time.

By way of example, the prediction engine 221 may compute probabilities for subsequent actions based on past patterns of user behavior following an action of a given type with the device 200. The past behavior may be correlated to a type of content displayed on the display 102. The probabilities may be updated as the user uses the device 200. The screen driver 212 may adjust the layout of the displayed portion of the content according to the probabilities. There are a number of different ways in which the layout may be adjusted. Preferably, the layout is adjusted in a way that facilitates one or more subsequent actions that are most probable. As noted above, this may include adjusting the placement of active elements, e.g., by locating active elements that are likely to be used in sequence closer together than in a default layout. In addition, the appearance of the active elements may be adjusted, e.g., active elements likely to be used may be highlighted or more brightly colored.

Furthermore, operation of one or more of the active elements may be adjusted, e.g., the order of items in a list, such as a contact list may be ordered with the most commonly used items near the top of the list.

Figure 10B:
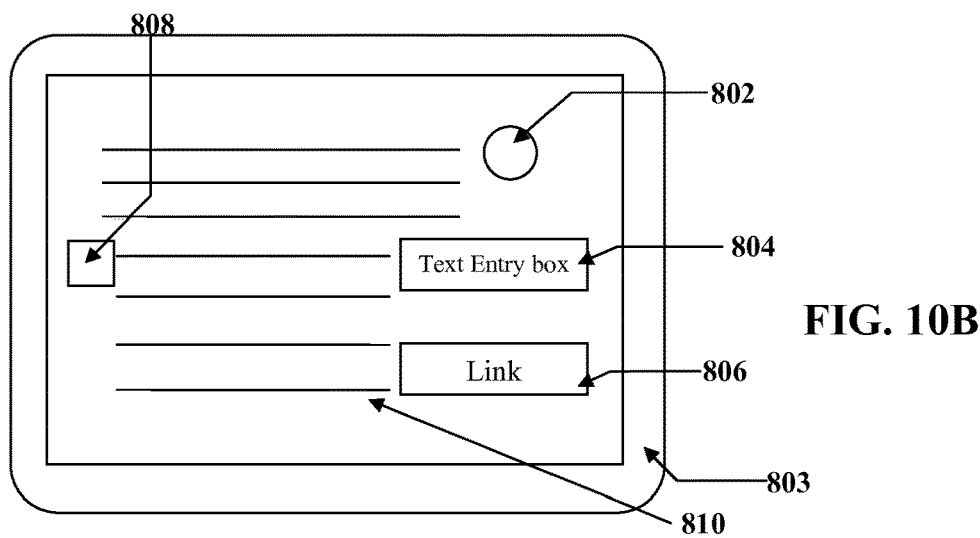
FIGS. 10B-10C are plan view schematic diagrams of a hand-held device at different stages of operation according to an embodiment of the present invention.
Figure 10C:
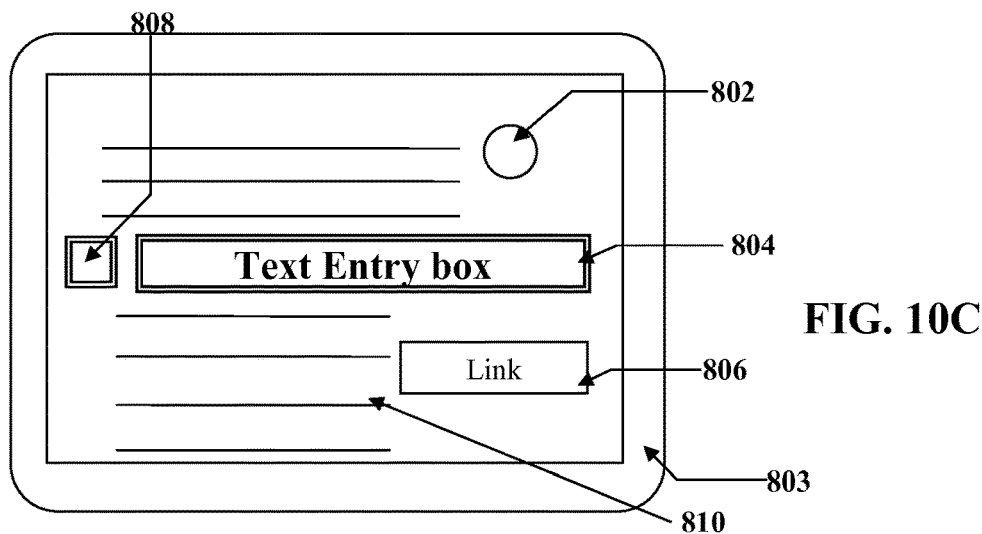

By way of example, in a "default" setting, absent any information regarding past user behavior, a device may display content, e.g., a web page, containing a radio button 802, text entry box 804, link 806, check box 808, and inactive normal text 810 as shown in FIG. 10B. The prediction engine 221 may determine, based on past user history, that when this page (or similarly configured content) is displayed the user has a high probability of checking the check box 808 and entering text in the text entry box 804. Based on these probabilities, the display driver 212 may modify display of the web page so that the text entry box 808 and check box 804 are made larger and/or more prominent and placed in close proximity to each other as shown in FIG. 10B.

In some implementations, the decomposition of the displayed content into regions and division of the touch interface into corresponding portions may change as a result of the modification of the display of the content. For example, the display driver 212 may modify the html canvas for the displayed content. After this happens the touch screen driver 212 may perform a new tessellation of the html canvas that the touch screen driver 213 may use to divide the touch interface into corresponding portions.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A hand-held electronic device, comprising:
 a hand-held case having one or more major surface;
 a visual display disposed on at least one major surface;
 a touch interface disposed on at least one major surface;
 a processor operably coupled to the visual display and the touch interface; and
 instructions executable by the processor, wherein the instructions are configured such that, when executed, the instructions cause the device to:
 a) present an image on the visual display containing one or more active elements and one or more inactive elements;
 b) decompose the image into a plurality of constituent regions that collectively make up the display, wherein each of said constituent regions corresponds to a different active element of the one or more active elements, wherein proportions of the decomposition of the image into the plurality of constituent regions are adjusted based on a probability that a user will use one or more active elements wherein the probability that user will use on or more of the active elements includes a probability of subsequent use of one or more active elements based on past use of one or more active elements;
c) correlate an active element in the image on the visual display to a corresponding touch sensitive region of the touch interface; and
d) activate one of the one or more active elements in response to a touch to the corresponding touch sensitive region of the touch interface by transforming the one of the one or more active elements from an initial state into a transformed state in which the one of the one or more active elements interact with the touch sensitive region in a different mode of operation in the transformed state than in the initial state, wherein the transformation is animated to signify a change to the different mode of operation.

2. The device of claim 1 wherein the visual display includes a touch screen that serves as the touch interface.

3. The device of claim 2, wherein the touch screen is configured to respond to a physical interaction with a stylus.

4. The device of claim 2, wherein the touch screen is configured to respond to a physical interaction with the user's finger.

5. The device of claim 1, wherein the touch interface is configured to respond to a physical interaction with the user's finger.

6. The device of claim 1, wherein b) includes performing a tessellation on the image.

7. The device of claim 6 wherein the tessellation divides the image into one or more convex regions.

8. The device of claim 6, wherein the tessellation is a Voronoi decomposition.

9. The device of claim 6, wherein the tessellation is performed on a browser-rendered canvas.

10. The device of claim 1 wherein the touch interface is a touch pad.

11. The device of claim 10 wherein the visual display and touch pad are disposed on a same side of the case.

12. The device of claim 10 wherein the visual display and touch pad are disposed on different sides of the case.

13. The device of claim 12 wherein the visual display is disposed on a front side of the case and the touch pad is disposed on a back side of the case.

14. The device of claim 10 wherein the case includes a first case portion and a second case portion wherein the visual display is disposed on the first case portion and wherein the touch pad is disposed on the second case portion.

15. The device of claim 14 wherein the first portion and the second case portion are slidably connected to each other.

16. The device of claim 14 wherein the first case portion and the second case portion are connected to each other in a hinged configuration.

17. The device of claim 16 wherein the first case portion and the second case portion are configured such that in a closed position the visual display and touch pad face inward.

18. The device of claim 16 wherein the first case portion and the second portion are configured such that in a closed position the one of the visual display and touch pad faces inward and the other of the touch pad and visual display faces outward.

19. The device of claim 16 wherein the first case portion and the second portion are configured such that in a closed position the visual display and touch pad face inward.

20. A method for operating a hand-held electronic device having a case with one or more major surfaces, a visual display disposed on at least one major surfaces, a touch interface disposed on at least one major surfaces, a processor operably coupled to the visual display and the touch interface; and instructions executable by the processor to implement the method, the method comprising:
a) presenting an image on the visual display containing one or more active elements and one or more inactive elements;
b) decomposing the image into a plurality of constituent regions that collectively make up the display, wherein each of said constituent regions corresponds to a different active element of the one or more active elements, wherein proportions of the decomposition of the image into the plurality of constituent regions are adjusted based on a probability that a user will use one or more active elements, wherein the probability that user will use on or more of the active elements includes a probability of subsequent use of one or more active elements based on past use of one or more active elements;
c) correlating an active element in the image on the visual display to a corresponding touch sensitive region of the touch interface; and
d) activating one of the one or more active elements in response to a touch to the corresponding touch sensitive region of the touch interface by transforming the one of the one or more active elements from an initial state into a transformed state in which the one of the one or more active elements interact with the touch sensitive region in a different mode of operation in the transformed state than in the initial state, wherein the transformation is animated to signify a change to the different mode of operation.

21. The method of claim 20, wherein b) includes performing a tessellation of the image.

22. The method of claim 21 wherein the tessellation divides the image into one or more convex regions.

23. The method of claim 21, wherein the tessellation is a Voronoi decomposition.

24. The method of claim 21, wherein the tessellation is performed on a browser-rendered canvas.

25. A non-transitory computer readable medium programmed with computer executable instructions for operating a hand-held electronic device having a hand-held case with one or more major surfaces, a visual display disposed on at least one major surfaces, a touch pad disposed on at least one major surfaces, a processor operably coupled to the visual display and the touch interface, wherein the instructions are executable by the processor to implement a method comprising:
a) presenting an image on the visual display containing one or more active elements and one or more inactive elements;
b) decomposing the image into a plurality of constituent regions that collectively make up the display, wherein each of said constituent regions corresponds to a different active element of the one or more active elements, wherein proportions of the decomposition of the image into the plurality of constituent regions are adjusted based on a probability that a user will use one or more active elements, wherein the probability that user will use on or more of the active elements includes a probability of subsequent use of one or more active elements based on past use of one or more active elements;
c) correlating an active element in the image on the visual display to a corresponding touch sensitive region of the touch interface; and d) activating one of the one or more active elements in response to a touch to the corresponding touch sensitive regions of the touch interface by transforming the one of the one or more active elements from an initial state into a transformed state in which the one of the one or more active elements interact with the touch sensitive region in a different mode of operation in the transformed state than in the initial state, wherein the transformation is animated to signify a change to the different mode of operation.

* * * * *